(12) United States Patent
Helwegen et al.

(10) Patent No.: US 11,699,077 B2
(45) Date of Patent: Jul. 11, 2023

(54) MULTI-LAYER NEURAL NETWORK SYSTEM AND METHOD

(71) Applicant: Plumerai Limited, London (GB)

(72) Inventors: Koen Giliam Helwegen, London (GB); Thomas Reint Bannink, London (GB); Timon David De Bruin, London (GB); Lukas Sebastian Geiger, London (GB); Adam Connor Slavin Hillier, London (GB); Jelmer Lucas Arnoldus Neeven, London (GB); Leendert Pieter Overweel, London (GB)

(73) Assignee: Plumerai Limited, London (GB)

( * ) Notice: Subject to any disclaimer, the term of this patent is extended or adjusted under 35 U.S.C. 154(b) by 0 days.

(21) Appl. No.: 17/353,121

(22) Filed: Jun. 21, 2021

(65) Prior Publication Data
US 2022/0405576 A1    Dec. 22, 2022

(51) Int. Cl.
*G06N 3/08*     (2006.01)
*G06N 3/04*     (2006.01)
*G06N 3/048*    (2023.01)

(52) U.S. Cl.
CPC .............. *G06N 3/08* (2013.01); *G06N 3/048* (2023.01)

(58) Field of Classification Search
CPC ........ G06N 3/08; G06N 3/0481; G06N 3/063; G06N 3/02; G06N 3/0454; G06N 3/049
USPC ........................................................ 706/15
See application file for complete search history.

(56) References Cited

U.S. PATENT DOCUMENTS

| | | | |
|---|---|---|---|
| 11,222,257 B1* | 1/2022 | Ko | G06F 7/5443 |
| 2019/0244061 A1* | 8/2019 | Gupta | G06K 9/6267 |

OTHER PUBLICATIONS

Umuroglu et al.—"Finn: A Framework for Fast, Scalable Binarized Neural Network Inference"—2016—https://arxiv.org/pdf/1612.07119.pdf (Year: 2016).*
Wang et al.—"Efficient Hardware Architectures for Deep Convolutional Neural Network"—2018—https://ieeexplore.ieee.org/stamp/stamp.jsp?tp=&arnumber=8118295&tag=1 (Year: 2018).*

(Continued)

*Primary Examiner* — Viker A Lamardo
(74) *Attorney, Agent, or Firm* — Pillsbury Winthrop Shaw Pittman LLP

(57) ABSTRACT

Provided is multi-layer neural network technique that includes: calculating, from an input and using a first one or more layers of a plurality of layers of a neural network, a first intermediate output; reducing a size of one or more dimensions of the first intermediate output; calculating, from the first intermediate output and using a second one or more layers of the neural network, a second intermediate output (the second one or more layers including one or more ultra-low precision layers); reducing a size of one or more dimensions of the second intermediate output; combining a plurality of reduced intermediate outputs (including the reduced first intermediate output and the reduced second intermediate output) to derive a combined intermediate output; and calculating, using the combined intermediate output and one or more higher-precision layers of the plurality of layers, a neural network output.

22 Claims, 11 Drawing Sheets

(56) References Cited

OTHER PUBLICATIONS

Alantali et al.—"SLID: Exploiting Spatial Locality in Input Data as a Computational Reuse Method for Efficient CNN "—Apr. 6, 2021—https://ieeexplore.ieee.org/stamp/stamp.jsp?tp=&arnumber=9395591 (Year: 2021).*
Bannink, Tom et al.; "Larq Compute Engine: Design, Benchmark, and Deploy State-of-the-art Binarized Neural Networks" arXiv:2011.09398v2 [cs.LG] Feb. 19, 2021; pp. 1-16.
Bethge, Joseph et al.; "BinaryDenseNet: Developing an Architecture for Binary Neural Networks".
He, Kaiming et al.; "Deep Residual Learning for Image Recognition" arXiv:1512.03385v1 [cs.CV] Dec. 10, 2015; pp. 1-12.
Helwegen, Koen et al.; "Latent Weights Do Not Exist: Rethinking Binarized Neural Network Optimization" arXiv:1906.02107v2 [cs.LG] Nov. 6, 2019; pp. 1-12.
Huang, Gao et al.; "Densely Connected Convolutional Networks" arXiv.1608.06993v5 [cs.CV] Jan. 28, 2018; pp. 1-9.
Lin, Tsung-Yi et al.; "Focal Loss for Dense Object Detection" arXiv:1708.02002v2 [cs.CV] Feb. 7, 2018; pp. 1-10.
Liu, Zechun et al.; "Bi-Real Net: Enhancing the Performance of 1-bit CNNs With Improved Representational Capability and Advanced Training Algorithm" arXiv:1808.00278v5 [cs.CV] Sep. 29, 2018; pp. 1-16.
Martinez, Brais et al.; "Training Binary Neural Networks With Real-to-Binary Convolutions" arXiv:2003.11535v1 [cs.GV] Mar. 25, 2020; pp. 1-11.
Sambasivarao. K, "Non-maximum Suppression (NMS)", Towards Data Science, dated Oct. 1, 2019, pp. 1-9, available at: "https://towardsdatascience.com/non-maximum-suppression-nms-93ce178e177c".
Wei Lu et al., "SSD: Single Shot MultiBox Detector", dated Dec. 29, 2016, pp. 1-17, Computer Vision—ECCV 2016, Lecture Notes in Computer Science, vol. 9905, Springer, Cham, available at: "https://arxiv.org/pdf/1512.02325.pdf".
Joseph Redmon et al., "You Only Look Once: Unified, Real-Time Object Detection", dated 2016, pp. 1-10, Proceedings of the IEEE Conference on Computer Vision and Pattern Recognition (CVPR), available at: "https://www.cv-foundation.org/openaccess/content_cvpr_2016/papers/Redmon_You_Only_Look_CVPR_2016_paper.pdf".
Jie Hu et al., "Squeeze-and-Excitation Networks", dated 2018, pp. 1-10, Proceedings of the IEEE Conference on Computer Vision and Pattern Recognition (CVPR), available at: "https://openaccess.thecvf.com/content_cvpr_2018/papers/Hu_Squeeze-and-Excitation_Networks_CVPR_2018_paper.pdf".

\* cited by examiner

MULTI-LAYER NEURAL NETWORK SYSTEM AND METHOD

TECHNICAL FIELD

The present disclosure relates to neural network systems and methods. In particular, but without limitation, this disclosure relates to systems and methods for neural networks including ultra-low precision layers.

BACKGROUND

Neural networks are being applied in an ever increasing number of fields to solve a wide array of problems. Deep neural networks have demonstrated state-of-the art performance in many of these fields, such as in image classification, object detection and speech recognition. Deep neural networks may use 32 bits, 16 bits or 8 bits to encode each of their weights and activations. The use of such higher precision weights and activations can make deep neural networks resource intensive. Storing higher precision weights may require a large amount of non-volatile memory. Furthermore, performing computations using higher precision weights and activations may require a large amount of working memory. The high computational resource usage of deep neural networks can prevent their use in many resource-constrained environments.

SUMMARY

According to a first aspect, there is provided a computer-implemented method comprising: obtaining an input; processing the input using a neural network comprising a plurality of layers comprising: calculating, using a first one or more layers of the plurality of layers, a first intermediate output from the input; reducing a size of one or more dimensions of the first intermediate output; calculating, using a second one or more layers, a second intermediate output from the first intermediate output, the second one or more layers comprising one or more ultra-low precision layers; reducing a size of one or more dimensions of the second intermediate output; combining a plurality of reduced intermediate outputs to derive a combined intermediate output, wherein the plurality of reduced intermediate outputs comprise the reduced first intermediate output and the reduced second intermediate output; and calculating, using one or more higher-precision layers of the plurality of layers, a neural network output using the combined intermediate output; and outputting an output based on the neural network output.

The second one or more layers may be a second plurality of layers.

The size of one or more dimensions of the first intermediate output may be reduced prior to execution of at least one of the second one or more layers.

Reducing a size of one or more dimensions of the first intermediate output may include reducing the spatial information of the first intermediate output. Reducing a size of one or more dimensions of the second intermediate output may include reducing spatial information of the second intermediate output.

The first intermediate output may be a higher-precision output and the second intermediate output may be a higher-precision output.

Reducing the spatial information of the first intermediate output may include performing a pooling operation on the first intermediate output. The pooling operation may be a global pooling operation.

The one or more ultra-low precision layers may include one or more binarized convolutional neural network layers.

The neural network may include a first part comprising the layers which are executed prior to the combining step. The first part may include a plurality of convolutional neural network layers. The first part comprises one or more operations having ultra-low precision inputs.

The method may include: for more than half of the convolutional layers in the first part of the neural network, reducing a size of one or more dimensions of the respective intermediate output to give a respective reduced intermediate output. The plurality of reduced intermediate outputs may include the respective reduced intermediate outputs.

The method may include: for all convolutional layers in the first part of the neural network, reducing a size of one or more dimensions of the respective intermediate output to give a respective reduced intermediate output. The plurality of intermediate outputs may include the respective reduced intermediate outputs.

The method may include: for more than half of the layers in the first part of the neural network outputting a higher precision intermediate output, reducing a size of one or more dimensions of the respective intermediate output to give a respective reduced intermediate output. The plurality of reduced intermediate outputs may include the respective reduced intermediate outputs.

A neural network layer receiving the input may be a higher precision layer. The neural network layer receiving the input may be a convolutional neural network layer which reduces a size of one or more spatial dimensions. A subsequent neural network layer may be a higher precision convolutional neural network layer which increases the number of channels. The method may further comprise, for the neural network layer receiving the input and for the subsequent neural network layer, reducing a size of one or more dimensions of the respective intermediate output to give a respective reduced intermediate output, wherein the plurality of reduced intermediate outputs comprises the respective reduced intermediate outputs.

The combined intermediate output may be used to weight the output channels of a convolutional neural network layer.

The neural network may include a second part comprising the layers which are executed after the combining step. The second part includes the one or more higher-precision layers. The second part may include only higher-precision layers, There are no ultra-low precision layers in the second part. There are no operations having ultra-low precision inputs in the second part.

According to a second aspect, there is provided a computer-implemented method for training a neural network. The method comprises: performing a forward pass using the neural network for each training sample of one or more training samples, each training sample comprising an input, performing each forward pass comprising: calculating; using a first one or more layers of the plurality of layers, a first intermediate output from the input; reducing a size of one or more dimensions of the first intermediate output; calculating, using a second one or more layers, a second intermediate output from the first intermediate output, the second one or more layers comprising one or more ultra-low precision layers; reducing a size of one or more dimensions of the second intermediate output; combining a plurality of reduced intermediate outputs to derive a combined intermediate output, wherein the plurality of reduced intermediate outputs comprise the reduced first intermediate output and the reduced second intermediate output; and calculating, using one or more higher-precision layers of the plurality of layers, a neural network output using the combined intermediate output; and updating the parameters of the neural network.

According to a third aspect, there is provided a computer program, optionally stored on a computer-readable medium, comprising instructions which, when the program is executed by a computer, cause the computer to carry out a method according to either or both of the first aspect and the second aspect.

According to a fourth aspect, there is provided a system comprising a neural network trained according to a method according to the second aspect.

According to a fifth aspect, there is provided a system comprising one or more processors. The one or more processors are configured to: process an input using a neural network comprising a plurality of layers, comprising: calculating, using a first one or more layers of the plurality of layers, a first intermediate output from the input; reducing a size of one or more dimensions of the first intermediate output; calculating, using a second one or more layers, a second intermediate output from the first intermediate output, the second one or more layers comprising one or more ultra-low precision layers; reducing a size of one or more dimensions of the second intermediate output; combining a plurality of reduced intermediate outputs to derive a combined intermediate output, wherein the plurality of reduced intermediate outputs comprise the reduced first intermediate output and the reduced second intermediate output; and calculating, using one or more higher-precision layers of the plurality of layers, a neural network output using the combined intermediate output.

BRIEF DESCRIPTION OF THE DRAWINGS

Systems and methods in accordance with non-limiting embodiments will now be described with reference to the accompanying figures in which.

DETAILED DESCRIPTION

Figure 1:
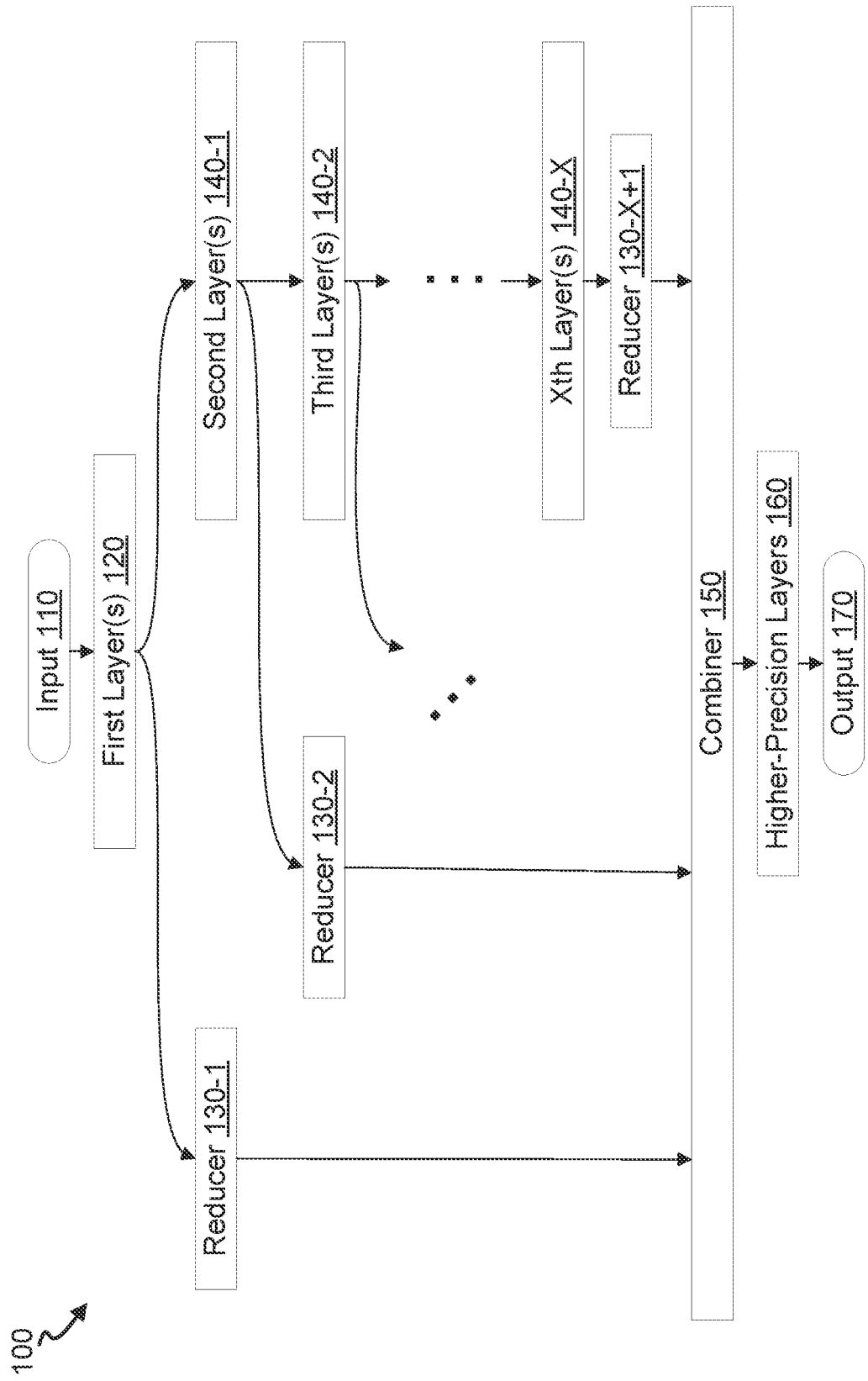
FIG. 1 shows a schematic diagram of a neural network used in a method in accordance with an embodiment.

Ultra-low precision neural network layers comprise ultra-low precision values for at least some of the input(s) to the layer. For ultra-low precision layers having weights, at least a portion of the weights are ultra-low precision values. For example, an ultra-low precision layer includes one or more operations having ultra-low precision inputs. For example, an ultra-low precision convolutional neural network layer applies a plurality of convolutional operations which take ultra-low precision input activations and use ultra-low precision filter weights. An ultra-low precision layer may have higher precision parameters, such as parameters for a batch normalization transform. The output from an ultra-low precision layer having ultra-low precision inputs can be higher precision due to higher precision parameters and/or operations that may be performed by an ultra-low precision layer, e.g. convolutions or averaging. The inputs to the layer are also referred to here as activations. The term "ultra-low precision value" is used herein to describe values stored in memory using 4-bits or less.

The term higher precision neural network layer is used herein to describe layers which comprise higher precision values for the inputs to the layer and the outputs of the layer. For a higher precision layer, all operations have higher precision inputs and outputs. For higher precision neural network layers having weights, the weights may be higher precision values or ultra-low precision values. The term "higher precision values" is used herein to refer to values stored in memory using more than 4-bits, for example 32 bits, 16 bits or 8 bits.

Such ultra-low precision neural network layers may use smaller storage capacity compared to higher-precision neural network layers. In particular, storing ultra-low precision weights may require a smaller amount of non-volatile memory, while ultra-low precision activations may require a smaller amount of working memory. Furthermore, performing computations using ultra-low precision weights and activations may be more energy-efficient than using high-precision values on commodity hardware and on specialized hardware, while the increase in energy efficiency on specialized hardware may be particularly pronounced. Hence, the use of deep neural networks in a resource-constrained environment may be facilitated by the use of ultra-low precision layers in the deep neural network. A deep neural network including ultra-low precision layers may be run on a resource-constrained device, such as a mobile phone, a microcontroller or a low-powered field programmable gate array (FPGA) for example.

However, replacing one or more layers in neural network architectures with an ultra-low precision neural network layer can in some cases result in a reduction in the task performance, e.g. the classification accuracy, of a neural network, Hence, neural network architectures facilitating the use of ultra-low precision layers while maintaining good task performance, e.g. a high classification accuracy, are desired. Such neural network architectures, and the training and uses thereof, are described herein.

In one such neural network architecture, the neural network comprises a first section including one or more ultra-low precision layers and a second section including one or more higher-precision layers. The model comprises multiple skip connections from the first section to the second section. The size of one or more dimensions of the data along the skip connections is reduced, e.g. by global pooling. The outputs of the skip connections are then combined prior to being input to the second section.

The use of skip connections connecting earlier layers in the first section of the neural network which output higher-precision values to the higher precision layers in the second section of the neural network output facilitates learning in those earlier layers. The skip connections carry gradients to those earlier layers in the backward pass, bypassing the one or more ultra-low precision neural network layers between the higher-precision layers and these earlier layers. This facilitates improved optimization of the weights of the first section during training, thus the resulting trained neural network may perform a task with improved accuracy as compared to a network without these skip connections.

Additionally, by reducing the size of one or more dimensions of the data along the skip connection, the overhead of these skip connections is reduced. The data along the skip connections is retained in memory (RAM) while the skipped layers are executed. By reducing size of one or more dimensions prior to execution of one or more skipped layers, only the reduced intermediate outputs are stored, e.g. globally pooled intermediate outputs. Hence, the data to be stored in memory during execution of the network may be reduced. By reducing the size of one or more dimensions prior to execution of one or more skipped layers, better use of storage capacity can be achieved. This may facilitate the use of the neural network architecture on resource-constrained devices, where the memory requirements of skip connections may otherwise be prohibitive.

FIG. 1 shows a schematic diagram of a neural network 100 used in a method in accordance with an embodiment.

The neural network receives an input 110. The input 110 may be a tensor, for example a vector, a (2D) matrix, a 3D matrix or a 4D matrix.

Any such input may be described as including spatial information. Spatial information may be described as information deriving partly or solely from the positions of elements in the tensor. Where the input 110 represents an image, such spatial information may represent the geometry of the image, e.g. the positions of different elements in the image in relation to one another. Where the input 110 represents a sound, such spatial information may represent the temporal ordering of the sound, e.g. the location of a value in the tensor may indicate when the given part of the sound occurred. Where the input 110 represents a time series of sensor data values, such as temperature or background radiation values, such spatial information may represent the temporal ordering of the sensor data values in the series, e.g. the location of a value in the tensor may indicate when the given sensor data value was recorded relative to the other values in the time series. In all cases, the location of the value in the tensor conveys certain information, such as a position or time.

The input 110 may represent an image. A greyscale image may be represented using a (2D) matrix. Each value in the (2D) matrix may indicate the intensity at the given location. For example, the lowest value may represent no light, e.g. black, and the highest value representing full light, e.g. white, with shades of grey represented accordingly, e.g. lighter shades of grey represented by higher values and darker shades of grey represented by lower values. Alternatively, this encoding of the intensities may be reversed. For example, the lowest value may represent full light, e.g. white, while the highest value may represent no light, e.g. black. Here, the dimensions of the (2D) matrix input may be described as two spatial dimensions, being the height and width.

A 3D matrix input may be described as being composed of multiple channels, with each channel being a (2D) matrix. Hence, the dimensions of a 3D matrix input may be described as two spatial dimensions (the height and width of each (2D) matrix) and a number of channels. Where the input 110 represents a 2D image, each channel may be a (2D) matrix with each of the channel representing aspects of a 2D image. The 3D matrix input may be used to represent a 2D colour image. For example, a 3D matrix input may include red, green and blue (RGB) channels, where the red channel is a (2D) matrix with each value in this (2D) matrix representing the intensity of red at the respective location, the green channel is a (2D) matrix with each value in this (2D) matrix representing the intensity of green at the respective location, and the blue channel is a (2D) matrix with each value in this (2D) matrix representing the intensity of blue at each location. The 3D matrix input may be used to represent a 2D colour image using an alternative representation, e.g. a different colour model, with each channel representing a component of that colour model. Examples of other colour models include the CMY (Cyan, Magenta. Yellow) model, the CMYK (Cyan, Magenta, Yellow, Key) model, the HSL (hue, saturation, lightness) model, and the HSV (hue, saturation, value) model. To represent a 3D image, a further channel may be used with the values at each location in this further (2D) matrix representing a depth at the respective location. The channels may alternatively or additionally include other representations of an image. For example, the input 110 may have been generated by applying a number of filters to an image to derive features, with each feature type being represented using a different channel. Note that the locations of the channels relative to the other channels in the tensor does not convey information.

The input 110 may be used to represent audio data. Where the input 110 is a (2D) matrix input, a (2D) matrix input 110 may be used to represent audio data as a spectrogram. The spectrogram represents a frame of audio data as the volume, e.g. in decibels, of different frequency bands for each of a number of audio timesteps in the frame. For example, each column of the matrix may include volumes of different frequency bands for a given timestep within the frame of audio, e.g. a column of the matrix corresponds to a timestep. Alternatively, each row may include volumes of different frequency bands for a given timestep, e.g. a row of the matrix corresponds to a timestep. Such a spectrogram may have been generated by applying a Fourier transform to the audio data, e.g. using a Fast Fourier Transform algorithm or a Short Time Fourier Transform algorithm. The audio data may also have had further pre-processing applied, e.g. the audio data may be a (2D) matrix containing Mel-frequency cepstral coefficients (MFCCs) for each of a series of time steps, and these may be the input 110. Alternatively or additionally, the input 110 may represent features at each of the timesteps. For example, a filter bank may be applied to the audio data to derive features for each timestep, and the values of the features for each timestep may be contained in a corresponding column or row for each timestep.

A (2D) matrix input 110 may be described as being composed of multiple channels, with each channel being a vector. Hence, the dimensions of a (2D) matrix input may be described as one spatial dimension (the length of each vector), and a number of channels. In the case of such an input representing audio data, the spatial dimension may be the number of audio timesteps represented in the input, with the number of channels being the number of different features, e.g. the number of frequency bands. In the case of a (2D) matrix input representing sensor data, the spatial dimension may be the number of timesteps represented in the input, with the number of channels being the number of different readings being captured, the number of different aspects being captured, or a combination thereof. For example, readings for temperature and background radiation may be captured for each timestep, with each being a respective channel. As another example, readings for different frequency bands of background radiation may be derived for each timestep, with each being a respective channel. A combination of these may include channels for different frequency bands of background radiation and a channel for temperature.

Audio data may be represented as a vector input as a series of amplitudes at each timestep in a frame of audio, e.g. the length of audio represented by each vector input. The length of the vector may be described as its spatial dimension.

Sensor data may be represented as a vector input as a series of sensor values, e.g. temperature or background radiation recordings, at each timestep in a frame of sensor reading, e.g. the number of sensor readings represented by each vector. The length of the vector may be described as its spatial dimension.

As is explained in relation to the above examples, in some cases all of the input dimensions are spatial dimensions, for example where the input is a (2D) matrix representing a 2D image. In other cases, one or more dimensions may be spatial dimensions, with other dimensions representing different channels, for example where the input is a 3D matrix representing a 2D image (e.g. with RGB channels) or a 2D matrix representing audio features at different time steps.

The input 110 is received by first layer(s) 120 of the neural network 100. The first layer(s) 120 process the input 110 to obtain a first intermediate output.

The first layer(s) 120 may be or include one or more higher-precision neural network layers, e.g. neural network layers that are of a higher precision than ultra-low precision neural network layers. Higher-precision neural network layers are layers where the inputs and the outputs are stored with 8-bits or more. The higher-precision neural network layer(s) may be or include one or more convolutional neural network layers.

The first layer(s) 120 may be or include one or more ultra-low precision neural network layers. Where the first layer(s) 120 include ultra-low precision layers, the first layer(s) 120 may include one or more precision reducing layers for reducing the precision of the input 110 and/or of the output of the preceding layer.

The first-layer(s) 120 may include one or more convolutional neural network layers. Additionally or alternatively, the first-layer(s) 120 may include one or more layers of other types, e.g. feedforward and/or recurrent neural network layers, which may be ultra-low precision and/or higher-precision layers.

The first intermediate output may be of the same dimensionality (have the same number of dimensions) as the input. For example, where the input is a 3D matrix, the first intermediate output may be a 3D matrix, where the input is a (2D) matrix, the first intermediate output may be a (2D) matrix, and where the input is a vector, the first intermediate output may be a vector. While the dimensionality may be the same, the size of one or more dimensions of the first intermediate output may be different from the input 110. For example, the first intermediate output may have a greater number of channels and smaller spatial dimensions than the input 110 as a result of applying filters by convolutional neural network layers of the first layer(s) 120.

Alternatively, the first intermediate output may be of a greater dimensionality than the input 110. For example, the input 110 may be a vector and the first intermediate output may be a (2D) matrix, or the input may be a (2D) matrix and the first intermediate output may be a 3D matrix. The additional dimension may be used for channels. Such channels may be derived, for example, by filters applied using convolutional neural network layers of the first layer(s) 120.

For ease of explanation, a set of first layer(s) 120 has been described. However, it should be understood that multiple such sets of layers may be present. For example, there may be multiple consecutive sets of higher-precision layer(s), each set producing a respective intermediate output which may be processed in the same manner as the first intermediate output.

The first intermediate output is processed by a reducer 130-1. The reducer 130-1 reduces the size of one or more dimensions of the first intermediate output, and outputs a reduced first intermediate output. For example, where the first intermediate output is a 48×64×8 tensor, the reduced first intermediate output may be a 1×1×8 tensor.

For example, the reducer 130-1 reduces the size of one or more spatial dimensions of the first intermediate output. The spatial dimensions of the first intermediate output are the dimensions that correspond to the spatial dimensions of the input 110. For example, where the height and width of the input 110 are the spatial dimensions, the height and width of the first intermediate output are the spatial dimensions. By reducing the size of one or more spatial dimensions, the reducer 130-1 reduces the spatial information of the first intermediate output. The reducer 130-1 may remove the spatial information of the first intermediate output.

The first intermediate output is a higher-precision output. The reduced first intermediate output is a higher-precision output. Thus, numerical, or precision, information is preserved in the reduced first intermediate output.

The reducer 130-1 may reduce the spatial information by any suitable method.

For example, the spatial information may be reduced by a pooling operation. A pooling operation reduces the spatial information by transforming multiple values in the spatial dimension(s) into a single value.

An example of a pooling operation is a global pooling operation. A global pooling operation derives a single value for each channel. Therefore, the result of the global pooling operation may be a vector containing a single value for each channel. Where there are c channels, the result of the global pooling operation and hence the reduced first intermediate output is a vector of length c. The pooling operation may be described as global since the pooling removes all spatial information, across all of the spatial dimension(s).

An example of a global pooling operation is global average pooling. A global average pooling operation is used to calculate the average value for each channel. For example, if the first intermediate output is a 3D matrix having 2 spatial dimensions and a plurality of channels then a single value for each channel would be calculated by averaging all of the values in the 2 spatial dimensions for that channel, e.g. the values in the (2D) matrix corresponding to that channel. In the case where the first intermediate output is a (2D) matrix having a spatial dimension and a plurality of channels then a single value for each channel would be calculated by averaging all of the values in the spatial dimension for that channel, e.g. the values in the vector corresponding to that channel.

Another example of a global pooling operation is global maximum pooling. A global maximum pooling operation is used to return the maximum value for each channel. For example, if the first intermediate output is a 3D matrix having 2 spatial dimensions and a plurality of channels then a single value for each channel would be found by locating the maximum value in the 2 spatial dimensions for that channel, e.g. the maximum value in the (2D) matrix corresponding to that channel. In the case where the first intermediate output is a (2D) matrix having a 1 spatial dimension and a plurality of channels then a single value for each channel would be found by finding the maximum value in the 1 spatial dimension for that channel, e.g. the maximum value in the vector corresponding to that channel. Another example of a global pooling operation is global minimum pooling. A global minimum pooling operation works in a corresponding manner to global maximum pooling but instead of locating the maximum value for each channel locates the minimum value for each channel.

Another example of a pooling operation is a local pooling operation. A local pooling operation reduces the size of the spatial dimensions by representing an area of values by a single value. When a local pooling operation is applied to a tensor, a block is stepped across the tensor values, returning a single value corresponding to each step. For example, a local pooling operation can be applied to a (2D) matrix in the following manner. An n×m block is stepped through the matrix values. The size of the step is referred to as the stride. At each position, a single value is returned, for example the average of the tensor values within the block area. In the below example, the case where n=m, and where the stride size is also equal to n, is described. However, various size and shape blocks and various stride sizes can be selected to provide a desired reduction in size.

For example, if the first intermediate output is a 3D matrix having two spatial dimensions and a plurality of channels, a 3D matrix having smaller spatial dimensions and the same number of channels would be returned by deriving a single value for each of a plurality of areas of the 2D matrices forming the first intermediate output. Each area is an n×n rectangle. The first intermediate output has spatial dimensions of x×y. The x×y matrices of the first intermediate output are each divided into areas of the size n×n with a single value calculated for each of these areas. Hence, the spatial dimensions of the reduced first intermediate output are x/n×y/n (where the network is designed so that x and y are multiples of n). Where there are c channels, the result of the local pooling operation, and hence the dimensions of the reduced first intermediate output, is a 3D matrix having the dimensions x/n×y/n×c.

As another example, if the first intermediate output is a (2D) matrix having one spatial dimension and a plurality of channels, a (2D) matrix having a smaller spatial dimension and the same number of channels would be returned by deriving a single value for each of a plurality of areas of the spatial dimension of the first intermediate output. In this case, each area may be a length n and the first intermediate output may have a spatial dimension of x. The stride size is set to n. The spatial dimension x is divided into areas of the size n with a single value calculated for each of these areas. Hence, the spatial dimension of the reduced first intermediate output are x/n (where the network is designed so that x is a multiple of n). Hence, where there are c channels, the result of the local pooling operation, and hence the dimensions of the reduced first intermediate output, is a (2D) matrix having the dimensions x/n×c.

Examples of local pooling include local average pooling, local maximum pooling, and local minimum pooling. In local average pooling, the value derived for each area is the average of the values in that area. In local maximum pooling, the value derived for each area is the maximum of the values in that area. In local minimum pooling, the value derived for each area is the minimum of the values in that area.

The spatial information may alternatively or additionally be reduced by applying a convolutional layer, e.g. a convolutional neural network layer, comprising a single filter with a stride of greater than 1. The stride of the convolutional layer in each dimension may be described as the step size between applications of the convolutional filter. For example, where a filter having a stride of 2 is applied to a (2D) matrix, the convolutional filter is moved 2 positions horizontally, e.g. to the right, for each horizontal movement of the filter, and is moved 2 positions vertically, e.g. down, for each vertical movement of the filter. If the stride is greater than 1, then the size of the output will be reduced.

The reduced first intermediate output is stored in working memory, e.g. RAM, processor cache and/or processor registers. The storing of the reduced first intermediate output may result from an explicit step in the program code. For example, the program code implementing the neural network may include an explicit step of storing the reduced first intermediate output in memory in a given data structure. Alternatively, the reduced first intermediate output may be stored in working memory by an engine which executes the neural network, as a result of a step of calculating the reduced first intermediate output in the program code. The engine subsequently ensures that the reduced first intermediate output is not discarded from working memory until after execution of the combiner 150. The engine which executes the neural network may employ a memory management scheme such as automatic reference counting or garbage collection. In these schemes, if an in-scope reference is maintained to the reduced first intermediate output or a representation thereof, then it will not be discarded. For example, the reduced first intermediate output may be assigned to one or more variables which remain in-scope for at least the period until the combiner 150 is executed. Thus, while at least one of the one or more variables remains in scope, there is an in-scope reference to the reduced first intermediate output, and it will be preserved in working memory.

The first intermediate output is also processed by the set of second layer(s) 140-1 of the neural network. The first intermediate output refers to the unreduced first intermediate output, e.g. the output of the first layer(s) 120 rather than the output of the reducer 130-1. The set of second layer(s) 140-1 calculates a second intermediate output based on the first intermediate output. The set of second layer(s) 140-1 comprises one or more ultra-low precision layers.

Ultra-low precision layers are layers where the input(s) are ultra-low precision, in other words are values represented using 4-bits or fewer. Examples of ultra-low precision layers are binarized neural network layers, ternarized neural network layers, and 4-bit quantized neural network layers.

In a binarized neural network layer, the ultra-low precision values are 1-bit. A 0-bit may be used to represent 1 and a 1-bit may be used to represent −1, or vice versa; or a 0-bit may be used to represent 0 and a 1-bit may be used to represent 1, or vice versa.

In a ternarized neural network layer, the ultra-low precision values are 2-bit and may represent −a, 0, or a, where a is a scaling factor, e.g. a floating-point or integer value used for scaling the outputs of the ternarized neural network layer. The relationship between the 2-bit values and the values which they represent may be defined per filter, per layer, for the whole network or at some other scale, e.g. for a given portion of the network.

In a 4-bit quantized neural network layer, the ultra-low precision values are 4-bit and can be used to represent 16 different values. These values may be referred to as grid points. The grid points may be evenly spaced across a range or may be densest towards the part of the range where the majority of values are likely to be, e.g. the centre of the range. The grid points may be specified by one or more parameters. The relationship between the 4-bit values and the values which they represent may be defined per filter, per layer, for the whole network or at some other scale, e.g. for a given portion of the network.

Using ultra-low precision layers in place of higher precision layers may reduce the computational resource usage of the neural network 100, In particular, storing ultra-low precision weights may require a smaller amount of non-volatile memory. Furthermore, performing computations using ultra-low precision weights and activations may require a smaller amount of working memory. Specialized hardware may also be used to perform such ultra-low precision operations efficiently.

A neural network layer may comprise a set of stored weights. In an ultra-low precision neural network layer, these weights are stored in non-volatile storage using 4-bits or fewer, and when the neural network is implemented, the weights are loaded into working memory and stored in working memory using 4-bits or fewer. Such neural network layers take a set of input values, also referred to here as activations, and perform a function on these values, using the stored weights. The function generally comprises a set of one or more multiplication operations and one or more sum operations.

For ultra-low precision neural network layers having weights, the computation of the function may be performed using ultra-low precision weights and activations. The ultra-low precision activations may be output from a quantization layer (precision reducing layer) directly before the ultra-low precision neural network layer having weights. The activations are also stored in working memory using 4-bits or fewer. The function may be computed using specialised hardware that is configured to perform multiplication and sum operations using ultra-low precision values. Alternatively, the function may be computed on a general hardware device by executing various additional operations allowing the function to be computed using the ultra-low precision values, for example operations controlling the arrangement, retrieval and storage of the values in working memory. The outputs are higher precision values, for example values stored using 32-bits.

Alternatively, the computation of the function may be performed by unpacking the ultra-low precision values to higher precision values, and then performing the computation using the higher precision weight and activation values. For example, where the weight values are each stored in memory using 1 bit, each weight value is converted to a 32-bit representation of the value and stored in working memory using 32 bits to perform the computation. The same value is stored, but using a 32-bit representation of the value rather than a 1-bit representation of the value. For example, where the weight value is −1, the 1 bit representation (0) is converted to a 32 bit representation of the value −1. The same unpacking is performed for the ultra-low precision input activations. The computation is then performed with the 32-bit values. The outputs are again higher precision values in this case, for example values stored using 32-bits. As another example, where the weight values are each stored in memory using 4-bits, each weight value is converted to an 8-bit representation of the value and stored in working memory using 8-bits to perform the computation. The same value is stored, but using an 8-bit representation of the value rather than a 4-bit representation of the value. For example, where the value is 5, the 4-bit representation of the value 5 is converted to a 32-bit representation of the value 5. The same unpacking is performed for the ultra-low precision input activations. The computation is then performed with the 8-bit values. The outputs are higher precision values, for example values stored using 8-bits.

The set of second layer(s) 140-1 may include a precision-reducing layer. The first intermediate output comprises higher-precision values. The precision-reducing layer derives an ultra-low precision output based on the first intermediate output. A precision-reducing layer may derive such an ultra-low precision output by mapping ranges of higher-precision values to respective ultra-low precision values. This derivation may be referred to as a quantization operation.

For example, a higher-precision value may be stored using a floating-point, fixed-point or integer format. Values greater than or equal to 0 may be mapped to a value of 1, while values less than 0 may be mapped to a value of −1. In the binary form, −1 is represented as a zero (or off) bit, and 1 is represented as a one (or on) bit. Such a quantization operation may be implemented efficiently since for common integer, floating-point and fixed-point representations of numbers, whether the value of a number is greater than zero may be derived by reading a single bit. In the case of most floating-point representations, the sign of the number, and hence whether it is less than or greater than or equal to zero, is represented using a sign bit. In the case of most signed integer representations, a two's complement representation is used, where a single bit represents $-2^n$, where n is the number of bits of the representation, with the other bits representing $2^0$ to $2^{n-1}$. Hence, in this representation whether a number is greater than or equal to zero or less than 0 may be derived by reading the single bit that represents $-2^n$. While this is the more common representation of signed integers, some implementations may use a sign bit instead. Fixed-point representations of numbers can be implemented using either two's complement or a sign bit.

The set of second layer(s) 140-1 may include one or more ultra-low precision convolutional neural network layers. The output values of an ultra-low precision convolutional neural network layer may be higher-precision values. For example, the output values of an ultra-low precision convolutional neural network layer may be stored in memory using 32 bits. In particular, a convolution operation involves a summation, hence the result of the convolution will span a greater range than the weights, and may therefore be represented at a higher-precision. In some examples, where an ultra-low precision convolutional neural network layer is directly followed by a subsequent ultra-low precision convolutional neural network layer, without any branches or skip connections, only an ultra-low precision representation of the outputs from the preceding ultra-low precision convolutional neural network is written to working memory, and this is then inputted directly to the following ultra-low precision convolutional neural network layer.

The convolutional layer may further comprise a non-linear activation function, which is applied to the values resulting from the convolution operation. Examples of suitable activation functions include ReLU, ReLU6, Leaky ReLU, Thresholded ReLu Exponential Linear Unit, and a Sigmoid function. The activation function is applied to the higher-precision values output from the convolution operation.

The convolutional layer may further comprise a batch normalization operation, which is applied to each of the values output from the activation function. During training, the mean and variance of the respective mini-batch may be used to perform the batch normalization. A scale and offset may additionally be used to perform the batch normalization. This scale and offset may be learned during training. During inference, the population mean and variance of the training dataset may be used to perform batch normalization. The batch normalization layer may also use the scale and offset to perform the batch normalization. During inference, as the population mean and variance and, where used, the scale and offset are fixed, the batch normalization operation amounts to a linear pointwise transformation. While the batch normalization operation has been described as being applied to the output from the activation function, a batch normalisation operation may alternatively or additionally be applied before the activation function.

An example of a binarized convolutional neural network layer for an input having 2 spatial dimensions and a number of channels is described mathematically below. A binarized convolutional neural network layer comprises a number of filters. The number of output channels from the layer corresponds to the number of filters in the layer. Each filter has the same depth as the input to the layer, i.e. the number of input channels. Each filter is moved along the width and height of the input. At each position, an element-wise multiplication of the input values and the weight values is taken, and the results summed to give a single output value for each position. This is referred to as a multiply accumulate (MAC) operation. The input for each channel may be padded. For examples, values, such as zeros, may be concatenated to the edges of a channel input, such that the respective convolutional filter can be applied on an area centred on elements at the edge of the channel input.

The output values for one filter form a 2D array. The output arrays from all the filters in the layer are stacked along the depth dimension, and the resulting volume input into the next layer. In binary form, −1 may be represented as a zero (or off) bit, and 1 represented as a one (or on) bit. The multiplication operation between an input value and a weight value can then be performed as an XNOR operation using the binary representation. Alternatively, a 0-bit may be used to represent 0 and a 1-bit may be used to represent 1, in which case the multiplication operation between an input value and a weight value can then be performed as an AND operation using the binary representation. The MAC computations in a binarized convolutional neural network layer may be binarized, where both weights and input activations used in the MAC operations are binary valued. The multiply-accumulate computations may be implemented as a bitwise operation, XNOR or AND for example, plus a bit-count operation.

The area over which the element-wise multiplication is performed is referred to as the kernel size. Where there are 2 spatial dimensions, the kernel size is two dimensional. For example, the kernel size may be N×N where N is a positive integer. N may be in the range of 1 to 7 for example. While square kernels are the most common, other kernel shapes may be used, e.g. a rectangular kernel with a kernel size of N×M where N is a first, positive integer and M is a different, second positive integer.

The output of the convolution operation for each output channel, out ∈[0, 0), is:

$$\hat{y}_{out} = \sum_{i=0}^{I-1} w_{out,i} * x_i$$

where * is the 2D cross-correlation operator, I and O denote the number of input and output channels; $w_{out,i}$ is a 2D matrix of weights of a convolutional filter, each of the weights representing 1 or −1; and $x_i$ is a matrix of the input values of the channel each of the values representing 1 or −1.

The output of the convolutional layer for each output channel is then calculated as:

$$y_{out} = \beta_{out} + \gamma_{out} \sigma(\hat{y}_{out})$$

where $\beta_{out}$ and $\gamma_{out}$ are the parameters for the batch normalizing transform, and $\sigma$ is the activation function.

The one or more ultra-low precision layers may include one or more ultra-low precision pooling layers. The one or more ultra-low precision pooling layers may include one or more ultra-low precision local pooling layers. The one or more ultra-low precision local pooling layers may include either or both of ultra-low precision local max pooling layers and/or ultra-low precision local average pooling layers. The output of an ultra-low precision local max pooling layer will be of the same precision as its input, as a maximum operation does not lead to values other than those included in the input. Hence, the output of an ultra-low precision local max pooling layer will be ultra-low precision. The output of an ultra-low precision local average pooling layer are higher precision values, since calculating an average, i.e. a mean, includes performing division. Alternatively or additionally, an ultra-low precision local majority voting pooling layer may be included, which outputs the most common value in the pooled area.

The second intermediate output may be a higher-precision output of an ultra-low precision convolutional layer of the second set of layer(s) 140-1, e.g. the last of the second set of layer(s) 140-1 may be an ultra-low precision convolutional neural network layer, or an ultra-low precision local average pooling layer for example.

The second intermediate output is processed by a reducer 130-2. The reducer 130-2 reduces the size of one or more dimensions of the second intermediate output, and outputs a reduced second intermediate output. The reducer 130-2 reduces the spatial information in the second intermediate output. The reducer 130-2 may reduce the spatial information in the second intermediate output by any of the methods described in relation to the reducer 130-1. The second intermediate output is a higher-precision output. The reduced second intermediate output is a higher-precision output. Thus, higher-precision numerical, or precision, information contained in the second intermediate output is preserved in the reduced second intermediate output.

The second intermediate output is also processed by the set of third layer(s) 140-2 of the neural network. The set of third layer(s) 140-2 comprises one or more ultra-low precision layers. The set of third layer(s) 140-2 calculate a third intermediate output based on the third intermediate output. As for the first intermediate output and the second intermediate output, the size of one or more dimensions of the third intermediate output may be reduced by a reducer, which may use any of the methods described in relation to the reducer 130-1.

The reducer 130-1 may reduce the spatial information of the first intermediate output after the execution of the set of second layer(s) 140-1 of the neural network but prior to the execution of the set of third layer(s) 140-2 of the neural network. In this way, only the reduced first intermediate output is stored in working memory whilst the calculations of the set of third layer(s) 140-2 are performed, rather than the full first intermediate output. Alternatively, the reducer 130-1 may reduce the spatial information of the first intermediate output after the execution of the set of third layer(s) 140-2 of the neural network, but prior to the execution of one or more subsequent ultra-low precision layers of the neural network. In this way, the reduced first intermediate output is stored in working memory whilst the calculations of the one or more subsequent ultra-low precision layers of the neural network are performed. The full first intermediate output may be deleted from working memory by a memory management scheme such as a garbage collection scheme, after the execution of the set of second layer(s) 140-1 of the neural network.

There may be any number, X, of ultra-low precision layers. The number of ultra-low precision layers may depend on the complexity of the task. For example, a neural network for performing a simple task may use a small number of ultra-low precision layers, e.g. 4 ultra-low precision layers, while a neural network for performing a more complex task may use more layers, e.g. 16 or 48 ultra-low precision layers. Each of these ultra-low precision layers may process an intermediate output from a preceding set of layers and calculate a further intermediate output based on this preceding intermediate output. The spatial information in each intermediate output may be reduced by a respective reducer, and the respective reducer may output a respective reduced intermediate output. Each of these respective reducers may reduce the spatial information by any of the methods described in relation to the reducer 130-1.

A set of $X^{th}$ layers 140-X is shown. The set of $X^{th}$ layer(s) 140-X comprises one or more ultra-low precision layers. The set of $X^{th}$ layers 140-X processes the intermediate output received from the $(X-1)^{th}$ set of layers and calculates an $(X+1)^{th}$ intermediate output based on this. The size of one or more dimensions of the $(X+1)^{th}$ intermediate output is reduced by the reducer 130-X+1, and a reduced $(X+1)^{th}$ intermediate output is output by the reducer. The reducer 130-X+1 may use any of the methods described in relation to the reducer 130-1.

A plurality of reduced intermediate outputs are received by a combiner 150. The plurality of reduced intermediate outputs includes the reduced intermediate outputs output by each of the reducers 130. The combiner 150 combines the reduced intermediate outputs to derive a combined intermediate output.

The connections from the first layer(s) 120 and the sets of layers comprising one or more ultra-low precision layers 140 other than the last set of layers 140-X to the combiner 150 via respective reducers 130 to the combiner may be referred to as skip connections, as they skip the layer(s) in between the respective layer and the combiner. A skip connection bypasses one or more layers, so that the output of one layer is used as part of the input to another layer which is subsequent to the one or more bypassed layers. The term skip connection is used herein to describe a connection which bypasses one or more layers. This includes a connection which bypasses a layer and feeds into a concatenation operation as well as a connection which bypasses a layer and feeds into an addition operation. A connection which bypasses a layer and feeds into an addition operation is sometimes referred to as a residual connection.

Skip connections facilitate the backpropagation of a learning signal, e.g. gradient, during training to the earlier layers in the network. The improved backpropagation of the learning signal information during training facilitates improved optimization of the weights of the neural network during training, thus the resulting trained neural network may have greater accuracy, e.g. provide more accurate estimations of classes or values, than a corresponding network without such skip connections. The learning signal is the signal that is back propagated through the network during the backward pass in training, and used as the input of the optimizer function to update the parameters of the network. In networks comprising only higher-precision layers, the learning signal approximately coincides with the mathematical gradient. In a binarized neural network for example, the mathematical gradient is zero almost everywhere and the learning signal relies on some 'pseudo-gradient'. In the backward pass, the derivative of the sign function, which is zero almost everywhere, is replaced with a different function, for example a step function in the case of the Straight Through Estimator.

The direct connection to the head of the network through the skip connections facilitates learning in the earlier layers, since the skip connections carry true gradients to those layers in the backward pass. In contrast, any non-zero learning signals that backpropagate through binarized layers for example do not coincide with the true gradient, which may negatively impact training.

Furthermore, where the skipped layer(s) include one or more ultra-low precision layers, skip connections preserve numerical information, e.g. precision information, which would otherwise be lost by precision-reducing operations, e.g. quantization, and/or precision-reducing layers, prior to these one or more ultra-low precision layers. Hence, the expressive power of a neural network with such skip connections is greater than a neural network without them, so the theoretical accuracy achievable by a neural network with such skip connections is greater.

By reducing the size of one or more dimensions of the data along the skip connection, the overhead of these skip connections is reduced in the forward pass. The data along the skip connections is retained in memory (RAM) while the skipped layers are executed. By reducing size of one or more dimensions prior to execution of one or more skipped layers, only the reduced intermediate outputs are stored, e.g. globally pooled intermediate outputs. Hence, the data to be stored in memory during execution of the network may be reduced. By reducing the size of one or more dimensions prior to execution of one or more skipped layers, better use of storage capacity can be achieved. This may facilitate the use of the neural network architecture on resource-constrained devices, where the memory requirements of skip connections may otherwise be prohibitive.

The combiner 150 may combine the plurality of reduced intermediate outputs by any suitable method. For example, the combiner 150 may combine the plurality of reduced intermediate outputs by concatenating the reduced intermediate outputs. Additionally or alternatively, the plurality of reduced intermediate outputs may be combined by adding and/or multiplying the plurality of reduced intermediate outputs with one another. In the case of addition and/or multiplication, one or more of the reduced intermediate outputs may be zero-padded such that the plurality of reduced intermediate outputs have the same length. Other combiners could be used, e.g. a combiner that applies an activation function or a fully connected layer to each of the reduced intermediate outputs prior to the concatenation.

The combined intermediate output is received by a set of higher-precision layers 160, which are layers comprising higher precision values for the inputs (activations) and the outputs of the layer. The set of higher-precision layers 160 calculate a neural network output 170 based on the combined intermediate output. The higher precision neural network layers 160 may comprise higher precision weights or ultra-low precision weights for example.

The higher-precision layers 160 may be referred to as a high-precision head of the network, where a high precision head is a set of layers in the network whose output does not directly or indirectly feed into any ultra-low precision layers before reaching the output of the network. The high-precision head is also referred to here as a second part or second section, and comprises all of the layers which are executed after the combiner 150. There are no ultra-low precision layers in the second part. The second part may include only higher-precision layers. During inference however, a precision reducing layer which outputs an ultra-low precision output may also be included as the final layer of the network for example.

The higher-precision layers 160 may be of any suitable type. For example, the higher-precision layers may include any or any combination of feedforward neural network neural network layers, e.g. linear layers, convolutional neural network layers, deconvolutional neural network layers, and/or pooling layers; and/or recurrent layers, e.g. Long Short-Term Memory Layers, or Gated Recurrent Unit Layers.

The neural network output 170 may be a numerical value, e.g. a floating point value or an integer value.

Where the neural network 100 is a neural network for single class classification, e.g. for determining whether or not the input to the neural network is in a given class or has a given property, the numerical value may represent the estimated probability of the input being in the given class. For example, the numerical value may be a floating-point or fixed-point value between 0 and 1 with 0 indicating that the input is not in the given class and 1 indicating that the input is in the given class.

Where the neural network 100 is a neural network for regression, e.g. for determining a value based on an input, the neural network output may be this determined value. For example, the determined value may be a control parameter for controlling the speed of a motor or the brightness of a light.

The neural network output 170 may be a vector.

Where the neural network 100 is a neural network for multi-class classification, e.g. for estimating whether or not the input to the neural network is in one or more of multiple classes or has one or more of multiple properties, each element of the vector may correspond to a class or property and the value of that element may represent the estimated probability of the input being in the corresponding class.

Where the neural network 100 is a neural network for multi-value regression, e.g. for determining multiple values based on the input to the neural network, each element of the vector may correspond to a respective value of the multiple values. For example, the determined multiple values may be control parameters for controlling a vehicle, with a first element of the vector being a value for the speed, a second element of the vector being a value for the turning angle, and a third element of the vector being a value for a braking force to apply. As another example, the neural network may be a network for locating an object in an image, and the multiple values may be offsets, e.g. offset distances in pixels, of a bounding box determined to contain the object from an anchor position for the bounding box. As another example, the neural network may be a network for gaze detection, and the multiple values may indicate the direction of the gaze.

The neural network output 170 may be a tensor, e.g. a matrix, a 3D matrix or a 4D matrix, which may be derived using one or more deconvolutional layers of the higher-precision layers 160. Alternatively or additionally a tensor output may be derived using one or more of the higher-precision layers 160 which receive spatial information from one or more of the preceding ultra-low precision layers 140, e.g. from a last convolutional layer of the ultra-low precision layers 140, in addition to the combined intermediate output or an output derived therefrom, e.g. by one or more of the higher-precision layers 160.

As an example of a tensor output, the neural network 100 may be a neural network for locating objects of multiple types in an input image and the output may be a 3D matrix including a respective (2D) matrix for each of a plurality of channels. Each channel in the output may correspond to a type of object, and the respective (2D) matrix may indicate the probability of an object of the respective type being present at each position in the input image. In some examples, one or more of the channels may indicate the probability of the pixel being a background pixel, e.g. not belonging to any object, and/or one or more of the channels may indicate the probability of the pixel being at the border of an image. The output may be used to perform image segmentation.

As another example, the neural network 100 may be a neural network for depth estimation, e.g. a neural network for determining the distance of pixels in the input image from an image capture device, and the output may be a (2D) matrix of continuous values, with each value indicating the distance from the image capture device at each position in the input image.

The neural network is an artificial neural network comprising ultra-low precision layers and a high-precision head.

Figure 2:
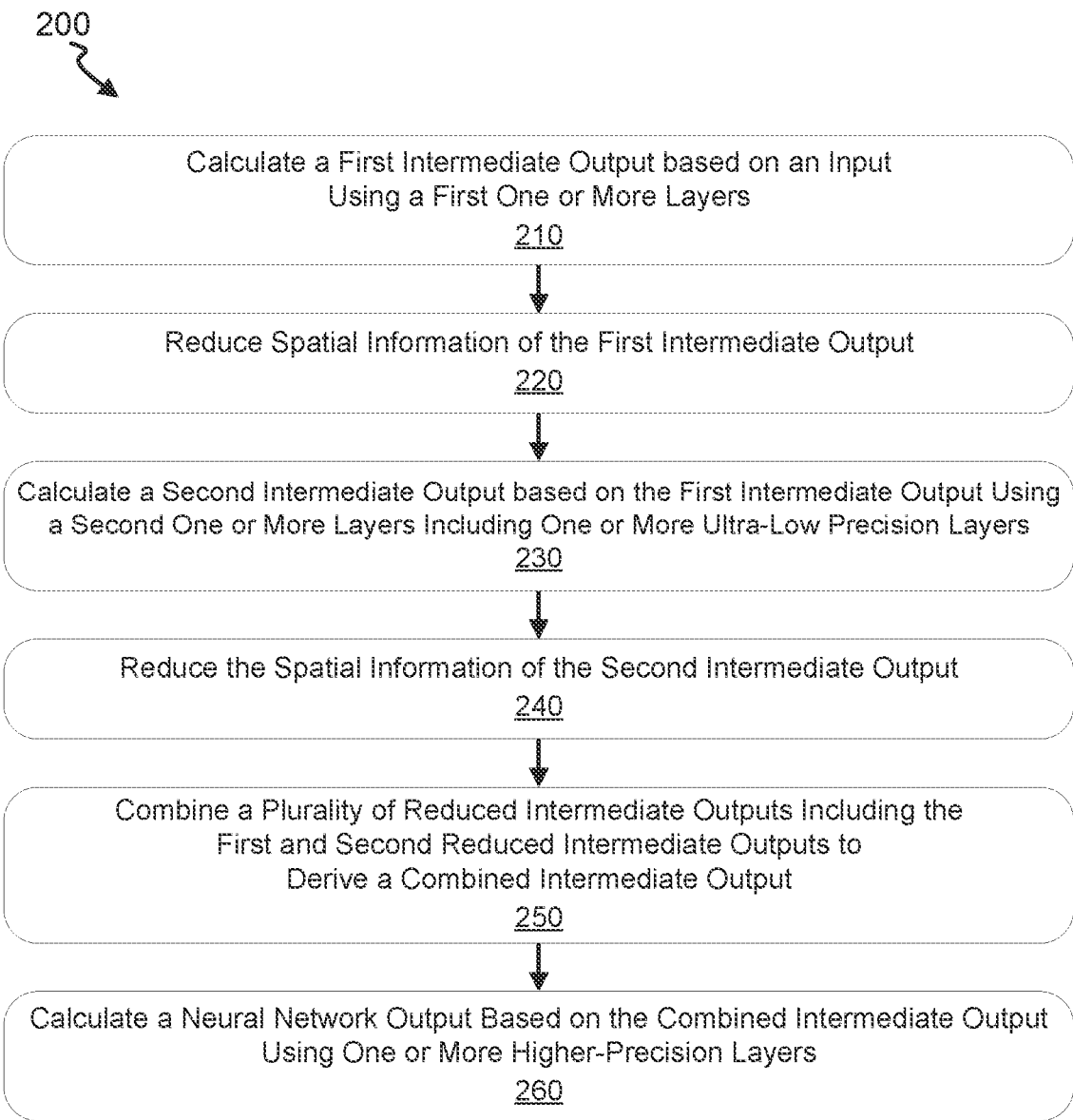
FIG. 2 shows a method for processing an input using a neural network in accordance with an embodiment.

FIG. 2 shows a method 200 for processing an input using a neural network to derive a neural network output according to an embodiment. The method 200 may be implemented as one or more computer-executable instructions executed on one or more computing devices, e.g. the computing device 500 described in relation to FIG. 5.

The method 200 is implemented using a neural network that includes a plurality of layers. The neural network 100 as described in relation to FIG. 1 is an example of such a network.

At step 210, a first intermediate output is calculated based on an input using a first one or more layers of the neural network.

The input may take any of the forms described in relation to the input 110. For example, the input may be a tensor, e.g. a 3D matrix, a (2D) matrix, or a vector. The first intermediate output may take any of the forms described in relation to the first intermediate output of the neural network 100 described in relation to FIG. 1. For example, the first intermediate output may be a tensor, e.g. a 3D matrix, a (2D) matrix, or a vector.

The first one or more layers may be the first layer(s) 120 described in relation to FIG. 1, The first one or more layers may include one or more higher-precision layers. The one or more higher-precision layers may be of any of the types previously described. The first one or more layers may include one or more ultra-low precision layers. The one or more ultra-low precision layers may be of any of the types previous described.

At step 220, a size of one or more dimensions of the first intermediate output is reduced. Spatial information of the first intermediate output is reduced. The first intermediate output with reduced spatial information may be referred to as the reduced first intermediate output. The spatial information may be reduced by any suitable method. For example, the spatial information may be reduced by performing a pooling operation, e.g. a global or local pooling operation, or by performing a convolutional operation having a stride of greater than 1. The spatial information of the first intermediate output may be reduced by any of the methods described in relation to the reducer 130-1 of FIG. 1.

At step 230, a second intermediate output is calculated based on the first intermediate output using a second one or more layers. The second one or more layers include one or more ultra-low precision layers. The one or more ultra-low precision layers may be of any of the types of ultra-low precision layers 140 described in relation to FIG. 1. The one or more ultra-low precision layers may be binarized, ternarized and/or 4-bit quantized layers. The one or more ultra-low precision layers may include any or any combination of ultra-low precision convolutional neural network layers, ultra-low precision pooling layers, and/or precision-reducing layers. The second one or more layers may additionally include one or more higher-precision layers, which may be of any of the types previously described.

At step 240, a size of one or more dimensions of the second intermediate output is reduced. Spatial information of the second intermediate output is reduced. The second intermediate output with reduced spatial information may be referred to as the reduced second intermediate output. The spatial information may be reduced using any of the methods by which the spatial information of the first intermediate output may be reduced as described in relation to step 220.

At step 250, a plurality of reduced intermediate outputs are combined to derive a combined intermediate output. The plurality of reduced intermediate outputs include the reduced first intermediate output and the reduced second intermediate output. For example, the plurality of reduced intermediate outputs may be combined by concatenating the reduced intermediate outputs. Additionally or alternatively, the plurality of reduced intermediate outputs may be combined by adding and/or multiplying the plurality of reduced intermediate outputs with one another. In the case of addition and/or multiplication, one or more of the reduced intermediate outputs may be zero-padded such that the plurality of reduced intermediate outputs have the same length.

At step 260, a neural network output is calculated based on the combined intermediate output using one or more higher-precision layers. The one or more higher-precision layers may be of any of the types described in FIG. 1 in relation to the higher-precision layers 160. For example, the one or more higher-precision layers may include any or any combination of feedforward neural network layers, e.g. linear layers, convolutional neural network layers, deconvolutional neural network layers, and/or pooling layers; and/or recurrent layers. The neural network output may take any of the forms described in relation to neural network output 170 in FIG. 1. For example, the calculated neural network output may be a numerical value, a vector, a (2D) matrix or a 3D matrix.

Figure 3:
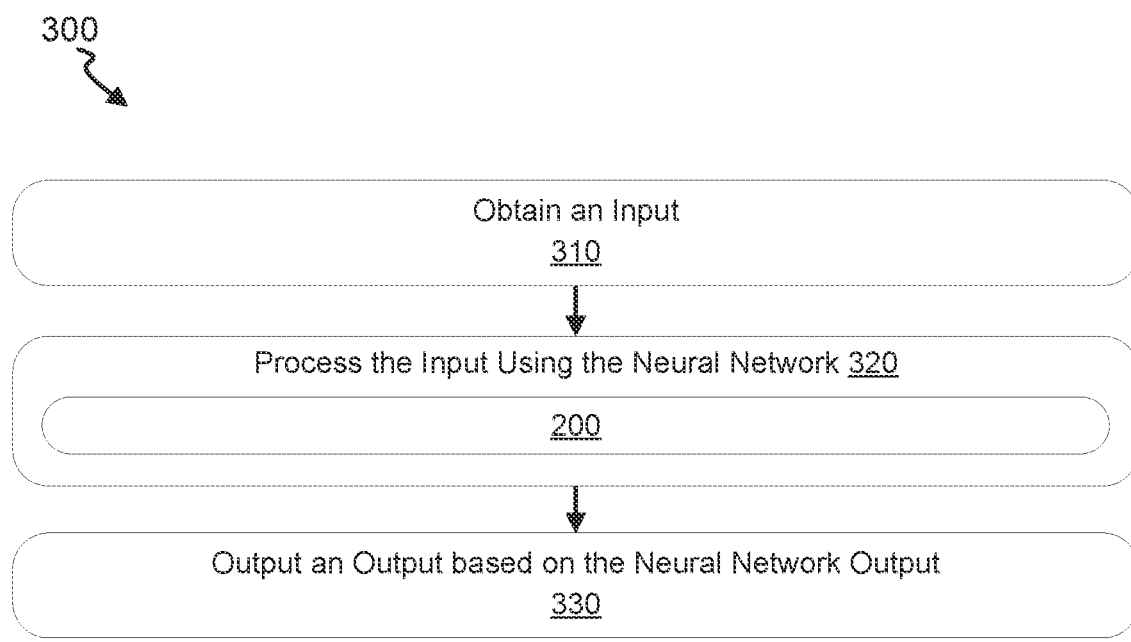
FIG. 3 shows a method using a neural network in accordance with an embodiment.

FIG. 3 shows a method 300 for outputting an output using a neural network according to an embodiment. The neural network may be the neural network 100 described in relation to FIG. 1. The method 300 may be implemented as one or more computer-executable instructions executed on one or more computing devices, e.g. the computing device 500 described in relation to FIG. 5.

At step 310, an input is obtained. The input may take any of the forms described in relation to the input 110. For example, the input may be a tensor, e.g. a 3D matrix, a (2D) matrix, or a vector. Examples of such inputs are also described in relation to the methods 300A, 300B, 300C of FIGS. 3A, 3B and 3C.

At step 320, the input is processed using the neural network. The processing of the input comprises the steps of the method 200. A neural network output is derived by this processing. The neural network output may be in any of the forms described in relation to step 260, e.g. a numerical value, a vector, a (2D) matrix or a 3D matrix. Examples of such neural network outputs are also described in relation to the methods 300A, 300B, 300C of FIGS. 3A, 3B and 3C.

At step 330, an output is outputted based on the neural network output, e.g. an indication of a classification, an image. Examples of outputs are also described in relation to the methods 300A, 300B, 300C of FIGS. 3A, 3B and 3C. The output may be output using any suitable method. For example, the output may be output by making one or more application programming interface calls; outputting one or more control signals, e.g. to a connected device or component; transferring data, e.g. over another network or to shared memory or persistent storage; and/or displaying the output by a display.

Figure 3A:
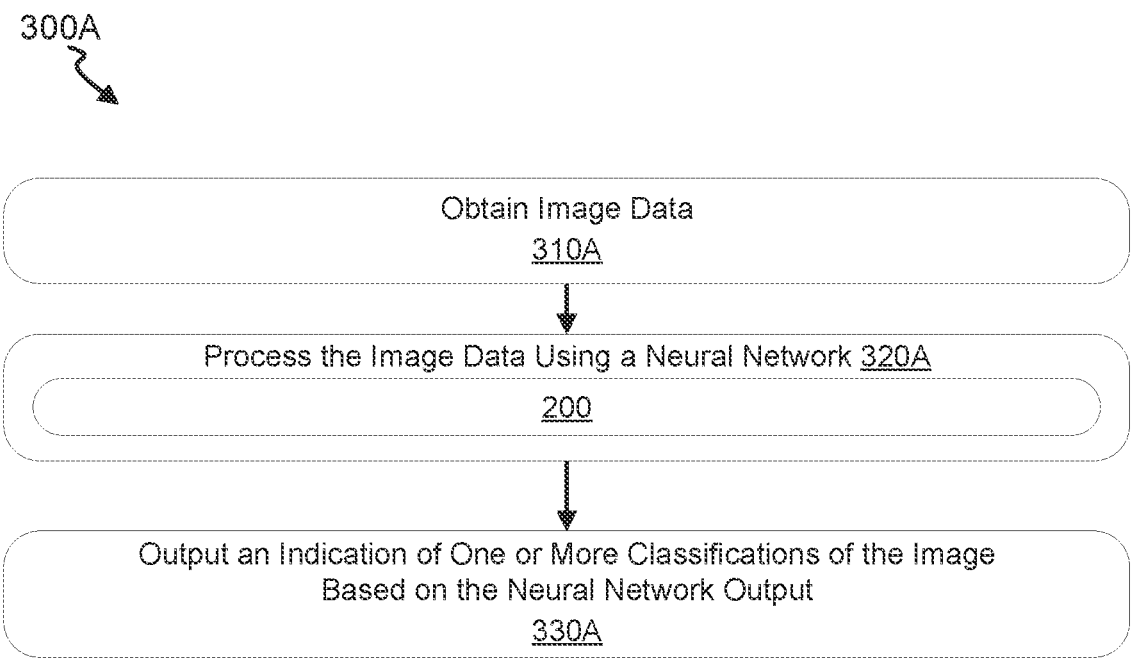
FIG. 3A shows a method for classifying an image using a neural network in accordance with an embodiment.

FIG. 3A shows a method 300A for classifying an image using a neural network. The neural network may be the neural network 100 described in relation to FIG. 1. The method 300A may be implemented as one or more computer-executable instructions executed on one or more computing devices, e.g. the computing device 500 described in relation to FIG. 5.

At step 310A, image data is obtained.

The image data may be a (2D) matrix representing a greyscale image. The image data may be a 3D matrix representing a colour image. For example, the 3D matrix may include red, green and blue (RGB) channels, where the red channel is a (2D) matrix with each value in this (2D) matrix representing the intensity of red at the respective location, the green channel is a (2D) matrix with each value in this (2D) matrix representing the intensity of green at the respective location, and the blue channel is a (2D) matrix with each value in this (2D) matrix representing the intensity of blue at each location. The matrix may be used to represent a colour image using an alternative representation, e.g. a different colour model, with each channel representing a component of that colour model.

At step 320A, the image data is processed using the neural network. The processing of the input comprises the steps of the method 200. A neural network output is derived by this processing. Where the classification of the image is single class classification, the neural network output may be a numerical value representing the estimated probability of the image being in that class. Where the classification of the image is multi-class classification, the neural network output may be a vector with each element of the vector corresponding to a class and the value of each element representing the estimated probability of the image being in the respective class.

At step 330A, an indication of one or more classifications of the image is output based on the neural network output.

For single class classification, the indication may be a binary value, e.g. a 1 or True value may be output if the image is determined to be in the class and a 0 or False value may be output if the image is determined not to be in the class. Such an indication may be derived by applying a step function to the neural network output, such that a 1 or True value is output if the estimated probability represented by the neural network output is above a threshold, and a 0 or False value otherwise.

For multi-class classification, the indication may be a vector of binary values, e.g. an element of the vector may correspond to a class, and a 1 or True value may be output if the image is determined to be in the class and a 0 or False value may be output if the image is determined not to be in the class. Where an image may be in multiple classes, such an indication may be derived by applying a step function to each of the elements of the neural network output vector. Where an image may be in a single class of the multiple classes, such an indication may be derived by locating the element of the vector representing the highest-estimated probability, and outputting a vector with that element set to 1 or True, which indicates that the image is in the class corresponding to that element of the vector and the other elements set to zero or false, e.g. a one-hot encoding.

Figure 3B:
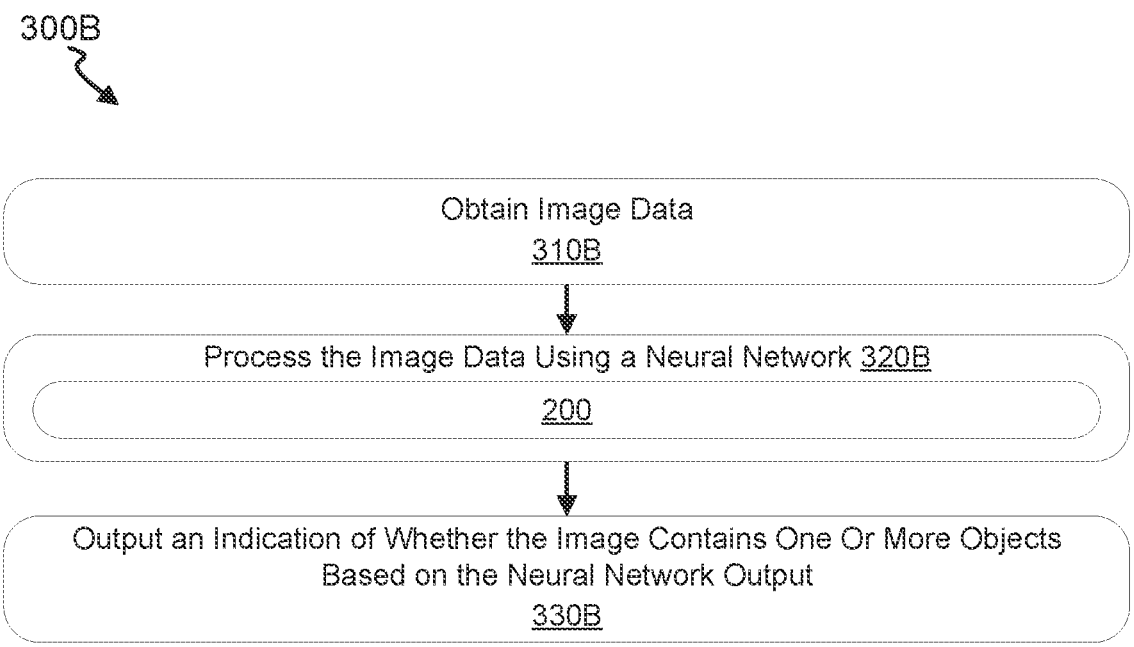
FIG. 3B shows a method for detecting an object using a neural network in accordance with an embodiment.

FIG. 3B shows a method 300B for detecting one or more objects using a neural network. The neural network may be the neural network 100 described in relation to FIG. 1. The method 300B may be implemented as one or more computer-executable instructions executed on one or more computing devices, e.g. the computing device 500 described in relation to FIG. 5.

At step 310B, image data is obtained. The image data may take any of the forms described in relation to step 310A.

At step 320B, the image data is processed using the neural network. The processing of the input comprises the steps of the method 200. A neural network output is derived by this processing. Where the detection is of a single type of object, the neural network output may be a numerical value representing the estimated probability of the object being present in the image. Where the detection is of multiple types of objects, the neural network output may be a vector with each element of the vector corresponding to a different type of object and the value of each element representing the estimated probability of the respective object being in the image. Where the detection is of a location of the object, the indication may indicate a first part indicating a probability of an object being present in a boundary having a shape of a given type within a portion of the image and a second part may include properties for these shapes and portions, e.g. a vertical offset, a horizontal offset, a height scaling factor, and a width scaling factor, as applied to a base shape and position in the portion. Such a base shape may be referred to as an anchor.

At step 330B, an indication of whether the image contains one or more objects is output based on the neural network output.

For detection of an object of a single type, the indication may be or include a binary value, e.g. a 1 or True value may be output if the object is determined to be present in the image and a 0 or False value may be output if the object is determined not to be present. Such an indication may be derived by applying a step function to the neural network output, such that a 1 or True value is output if the estimated probability represented by the neural network output is above a threshold, and a 0 or False value otherwise.

For detection of objects of multiple types in an image, the indication may be or include a vector of binary values, e.g. an element of the vector may correspond to a given object, and that element may be a 1 or True value if the object is determined to be in the image and a 0 or False value otherwise. Such an indication may be derived by applying a step function to each of the elements of the neural network output vector.

For detection of an object including detecting the location of the object, the indication may be or include an indication of a boundary containing the object. An example of a technique which may be used in detecting the location of one or more objects in an image is Non-maximum Suppression (NMS). As part of the process of detecting the locations of the object(s) in an image, multiple predicted boundaries are determined. In NMS, a best boundary, e.g. bounding box, for an image is selected and other bounding boxes are rejected or 'suppressed'. The process of selecting the best boundary using NMS is as follows. The boundary with the highest confidence is selected, e.g. the boundary that has been determined by the network to be most likely to contain an object is selected. The overlap (intersection over union) of this boundary with other determined boundaries is calculated. Other determined boundaries with an overlap (intersection over union) with the best boundary of more than a threshold, e.g. 50%, are removed. These steps are then iteratively repeated for the remaining determined boundaries with the next highest confidence until no overlapping boundaries remain. Another technique that may be used is Soft NMS, which is similar to NMS, but reduces the confidence score of other determined boundaries overlapping the boundary with the highest confidence rather than removing the other determined boundaries.

Figure 3C:
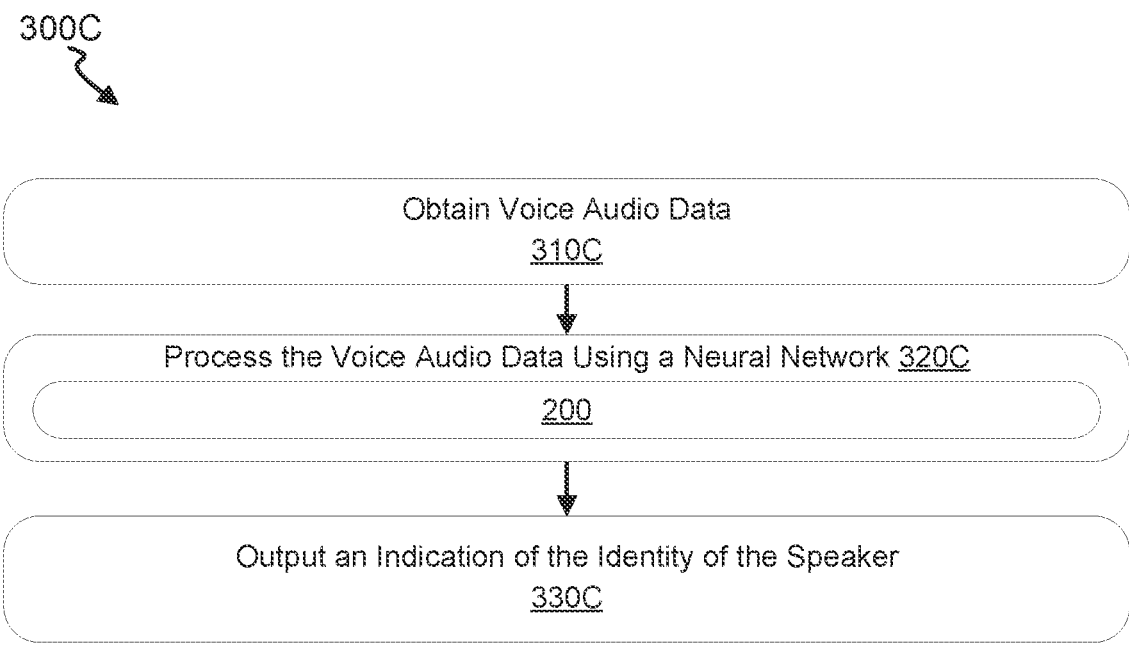
FIG. 3C shows a method for identifying a speaker using a neural network in accordance with an embodiment.

FIG. 3C shows a method 300C for identifying a speaker using a neural network. The neural network may be the neural network 100 described in relation to FIG. 1. The method 300C may be implemented as one or more computer-executable instructions executed on one or more computing devices, e.g. the computing device 500 described in relation to FIG. 5.

At step 310C, voice audio data is obtained. The voice audio data may be a 2D matrix which represents audio as a spectrogram. The spectrogram represents a frame of audio data as the volume, e.g. in decibels, of different frequency bands for each of a number of audio timesteps in the frame. For example, each column of the matrix may include volumes of different frequency bands for a given timestep within the frame of audio, e.g. a column of the matrix corresponds to a timestep. Alternatively, each row may include volumes of different frequency bands for a given timestep, e.g. a row of the matrix corresponds to a timestep. Such a spectrogram may have been generated by applying a Fourier transform to the audio data, e.g. using a Fast Fourier Transform algorithm or a Short Time Fourier Transform algorithm. The voice audio data may also have had further pre-processing applied, e.g. the voice audio data may be a (2D) matrix containing Mel-frequency cepstral coefficients (MFCCs) for each of a series of time steps.

At step 320C, the voice audio data is processed using the neural network. The processing of the input comprises the steps of the method 200. A neural network output is derived by this processing. The neural network output may be a vector with each element of the vector corresponding to a different speaker and the value of each element representing the estimated probability that the voice audio was spoken by the respective speaker.

At step 330C, an indication of the identity of the speaker is output based on the neural network output. The indication may be a vector of binary values, e.g. an element of the vector may correspond to a given speaker, and that element may be a 1 or True value if the voice audio is determined to have been spoken by that speaker and a 0 or False value otherwise. Such an indication may be derived by locating the element of the vector representing the highest-estimated probability, and outputting a vector with that element set to 1 or True, which indicates that the speaker of the voice audio is the speaker corresponding to that element of the vector and the other elements set to zero or false, e.g. a one-hot encoding.

Figure 4:
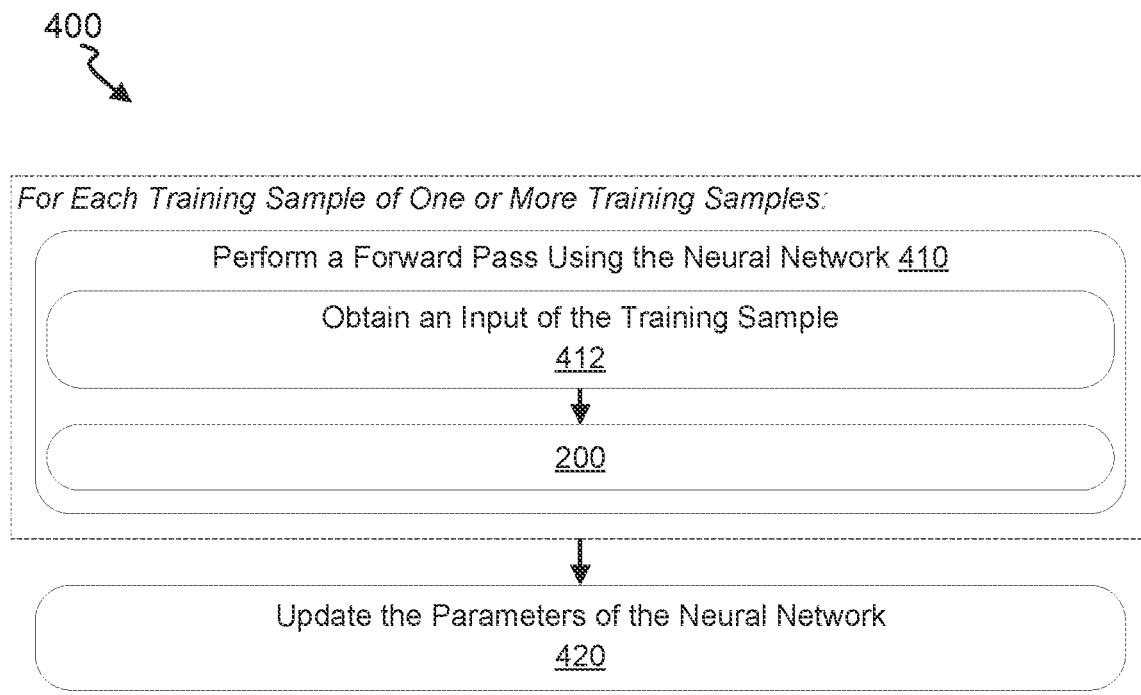
FIG. 4 shows a method for training a neural network in accordance with an embodiment.

FIG. 4 shows a method 400 for training a neural network. The neural network may be the neural network 100 described in relation to FIG. 1. The method 400 may be implemented as one or more computer-executable instructions executed on one or more computing devices, e.g. the computing device 500 described in relation to FIG. 5.

The method 400 illustrates the steps performed in an iteration of the training. A plurality of iterations of the method 400 may be performed in the training of the neural network. One or more training samples are used in each such iteration. The one or more training samples are training samples of a set of training samples. The number of training samples of the set of training samples used in each such iteration is a hyperparameter for the training. In 'batch' training, all of the set of training samples are used in each iteration, i.e. the one or more training samples are all of the set of training samples. In 'mini-batch' training, a subset of the set of training samples is used in each iteration, i.e. the one or more training samples are a subset of the set of training samples. For example, a fixed number of training samples may be used in each iteration. The number of training samples used in each iteration may be in the range of 32 to 1024, may be more than 1024, or may be less than 32 depending on the specific training data or network. Examples of numbers of training samples that may be used in each iteration include 32, 64, 128, 256, 512, or 1024. In 'stochastic' training, one training sample of the set of training samples is used in each iteration, i.e. the one or more training samples are one training sample of the set of training samples.

Each training sample includes at least an input. The input may be in any of the forms described in relation to the input 310, e.g. a tensor, such as a vector, (2D) matrix, or a 3D matrix.

Each training sample may further include a "true" or "gold standard" output. The gold standard output may indicate the desired or expected output for the given input.

For example, where the neural network is being trained for classification, the gold standard output may represent the correct classification for the input, e.g. a classification given to the input by a human. In the case of single class classification, the gold standard output may be a single value indicating whether the input is in the class, e.g. a 1 if the input is the class and a 0 if the input is not in the class. In the case of multi-class classification, the gold standard output may be a vector indicating which class(es) the input is in, e.g. each element of the vector may correspond to a class, and the elements) corresponding to the class(es) which the input is in may have a value of 1 and the other elements may have a value of 0.

As another example, where the neural network is being trained for regression, the gold standard output may be a value for the input determined by a human or by empirical measurement. In the case of multi-value regression, the gold standard output may be a vector including each of these values as different elements of the vector.

As another example, where the neural network is being trained to output a feature map, the gold standard neural network output may be a 3D matrix output with 2D spatial dimensions and a plurality of channels. Each channel may represent a different type of feature, e.g. edges, shadows and continuous colour blocks with the values for each element of the spatial dimensions for the respective channel indicating the probability of the feature being present at their location or the intensity of the feature at that location.

The gold standard output may be an output for locating objects, e.g. as described in relation to the example implementation neural network 600B. Such a gold standard output may include a first part indicating whether or not an object is present in a boundary having a shape of a given type within a portion of the image and a second part may include properties for these shapes and portions, e.g. a vertical offset, a horizontal offset, a height scaling factor, and a width scaling factor, as applied to a base shape and position in the portion. Such a base shape may be referred to as an anchor.

As another example, where the neural network is being trained to control an agent, e.g. to determine one or more actions to be performed by an agent, the gold standard output may be a representation of an optimal action to perform which may be represented in the same way as a classification.

Alternatively or additionally, the neural network may be trained using a reinforcement learning technique, and each training sample may include an action performed in an environment and a reward received in response to performing the action in the environment. These may be determined based on feedback received from an environment in response to performing one or more actions.

For each training sample of the one or more training samples, a step 410 is performed. At step 410, a forward pass is performed using the neural network.

Step 410 includes an obtaining step 412. At the obtaining step 412, the input of the training sample is obtained. Step 410 further includes the steps of method 200 which are performed using the obtained input of the training sample. The steps of the method 200 derive a neural network output based on the input of the training sample.

At step 420, the parameters of the neural network are updated.

The parameters, e.g. weights, of the neural network may be updated in accordance with a loss function, e.g. updated with the goal of minimizing the value of the loss function. The loss function may be based on a comparison of the neural network outputs and the gold standard outputs for the one or more training samples. Examples of loss functions for classification include (categorical) cross-entropy loss, hinge loss, Kullback-Leibler divergence loss, and focal loss. Examples of loss functions for regression include mean squared error, mean absolute error, and Log-Cosh loss. In the case of a neural network being trained using reinforcement learning, the loss function may be based on a comparison of a predicted reward for an action with an actual reward for the action. A loss function used for regression may be used to calculate this difference.

The parameters, e.g. weights, may be updated by back-propagating a learning signal based on the value of the loss function. The learning signal may be a gradient, a pseudo-gradient, or any other suitable learning signal. For ultra-low precision layers, and particularly for binarized layers, a pseudo-gradient may be used. The gradients for binarized weights are usually zero, so do not provide a useful learning signal. A pseudo-gradient is instead used during training, as described in more detail below.

An update procedure is implemented by storing higher-precision weights corresponding to each of the ultra-low precision weights in the network. These higher precision weights are also referred to as latent weights. During the forward pass, the latent weights are converted to ultra-low precision weights (for example by binarizing), and the ultra-low precision weights are used to generate the neural network output. The latent higher-precision weights are then updated based on the pseudo-gradient using an optimiser function, for example Adam or Momentum.

In the case of binarized weights, an alternative update procedure may be followed, in which a binary optimizer using the exponential moving average of gradients is used to directly update the binary weights. This procedure may be used as an alternative to a procedure using latent weights.

In neural networks including higher-precision and ultra-low precision layers, both gradients and pseudo-gradients are used. The use of skip connections connecting earlier layers in the neural network which output higher-precision values to the higher precision layers preceding the neural network output facilitates learning in those earlier layers. The skip connections carry true gradients to those layers in the backward pass, bypassing the one or more ultra-low precision neural network layers between the higher-precision layers and these earlier layers. In contrast, the learning signals that backpropagate through binarized layers for example do not coincide with the true gradient. The skip connections may therefore result in the trained neural network being more accurate, e.g. in the trained neural network predicting more accurate values or classifications.

The pseudo-gradient is further explained in relation to the below. A neural network may be described by:

$$y = f(x, w) \quad (1)$$

where w are the parameters, e.g. weights, of the neural network, x are the inputs to the neural network, and y are the outputs from the neural network. In supervised training of neural networks, a ground truth $\bar{y}$, e.g. a gold standard output, is available, using which a loss value $L(y,\bar{y})$, may be calculated using a loss function L. Training neural networks uses backpropagation and gradient descent.

Backpropagation enables efficient computation of the gradient of a loss function with respect to the parameters w of the network:

$$g_w = \frac{\delta L(y, \bar{y})}{\delta w} = \nabla_w L \quad (2)$$

Where $\nabla_x$ denotes the gradient operator with respect to variable x:

$$\nabla_a f(a, b) = \frac{\delta}{\delta a} f(a, b) \quad (3)$$

Backpropagation uses repeated application of the chain rule to calculate the gradient for all parameters w in the network.

Gradient descent provides the basis rule for updating the weights based on this gradient. In a simple variant, the update is described by:

$$w \leftarrow w - lg \quad (4)$$

where l is the learning rate. This is also referred to as an optimiser function.

In the case of ultra-low precision neural networks, the true gradient as defined by (2) is zero for most weights, because the intermediate activations which are computed with the weights are quantized. For example, in a binarized neural network (BNN), for a layer N with inputs $a_{N-1}$, weights $w_N$, activation function $\pi(\cdot)$ and outputs $a_N$ is defined as:

$$a_N = \text{sign}(\pi(w_N a_{N-1})) \quad (5)$$

then the gradient is:

$$\nabla_{w_N} L = \nabla_{a_N} L \cdot \nabla_{w_N} a_N$$

$$= \nabla_{a_N} L \cdot 0$$

$$= 0 \text{ almost everywhere.} \quad (6)$$

The true gradient does not provide a signal that can be used to effectively update the weights in the network using the optimiser in (4). An alternative learning signal is used for training BNNs, which may be obtained by replacing $\nabla_{w_N} a_N$ by some pseudo-gradient $\tilde{\nabla}_{w_N} a_N$. In the straight-through estimator:

$$\tilde{\nabla}_x \text{sign}(x) = 1_{x \in [-1,1]} \quad (7)$$

where 1 denotes the indicator function. In other words, the pseudo-derivative of the sign according to the straight-through estimator is 1 if x lies between −1 and 1. Using the straight-through estimator in place of the actual derivative of the sign allows backpropagation of the pseudo-gradient, such that the learning signal can be defined as:

$$\tilde{g}_w = \tilde{\nabla}_w L. \quad (8)$$

In contrast to $g_w$, $\tilde{g}_w$ is non-zero despite the presence of the sign function, so may be used as input to an optimizer.

The definition of the pseudo-gradient and associated learning signal is independent from the way this signal is then used to update the weights, namely the optimizer algorithm.

For example, the above pseudo-gradient and associated learning signal may be used in an optimization procedure using latent weights or with a binary optimizer using the exponential moving average of gradients as described above.

Figure 5:
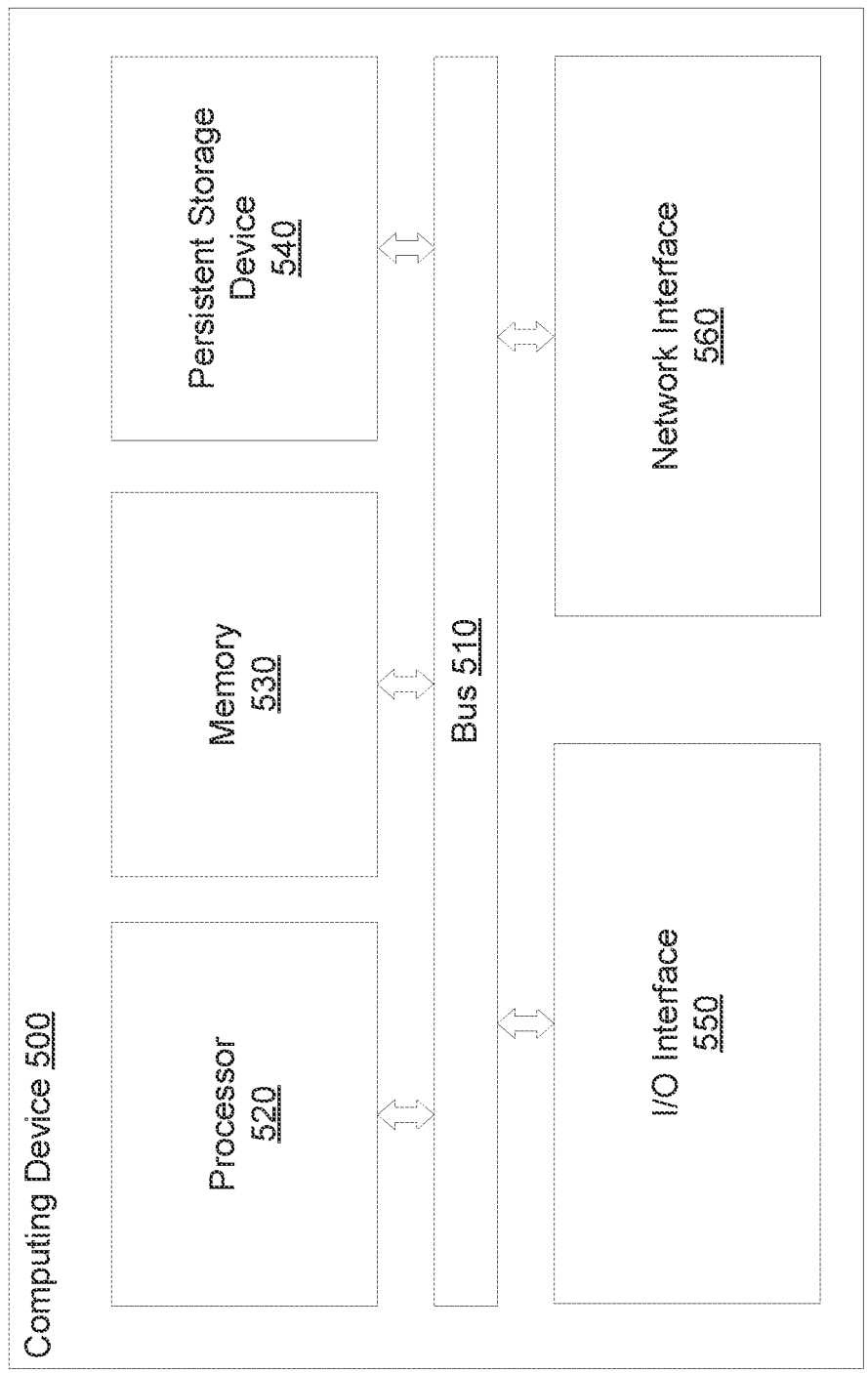
FIG. 5 shows a system according to an embodiment.

FIG. 5 shows a computing device 500 according to an embodiment. The methods described herein may be implemented on the computing device 500.

The computing device 500 includes a bus 510, a processor 520, a memory 530, a persistent storage device 540, an Input/Output (I/O) interface 550, and a network interface 560.

The bus 510 interconnects the components of the computing device 500. The bus may be any circuitry suitable for interconnecting the components of the computing device 500. For example, where the computing device 500 is a desktop or laptop computer, the bus 510 may be an internal bus located on a computer motherboard of the computing device. As another example, where the computing device 500 is a smartphone or tablet, the bus 510 may be a global bus of a system on a chip (SoC).

The processor 520 is a processing device configured to perform computer-executable instructions loaded from the memory 530. The processor 520 may comprise logic circuitry that responds to and processes the instructions. Execution of the instructions causes methods as described herein to be implemented. Prior to and/or during the performance of computer-executable instructions, the processor may load computer-executable instructions over the bus from the memory 530 into one or more caches and/or one or more registers of the processor. The processor 520 may be a central processing unit with a suitable computer architecture, e.g. an x86-64 or ARM architecture. Examples of ARM architectures include ARM Cortex M and ARM Cortex A. The processor 520 may include or alternatively be specialised hardware adapted for application-specific operations, e.g. ultra-low precision convolutions. Such specialized hardware may be implemented as an application-specific integrated chip (ASIC) or using a field programmable gate array (FPGA) or programmable logic device (PLD).

As illustrated, the device 500 comprises a single processor 520. However, the methods described herein may be executed across multiple processing components, which may be located remotely, for example, using cloud based processing. For example, the device 500 may comprise at least one graphical processing unit (GPU) and a general central processing unit (CPU), where various operations described in relation to the methods are implemented by the GPU, and other operations are implemented by the CPU. For example, matrix operations or vector operations are performed by a GPU.

The memory 530 is configured to store instructions and data for utilization by the processor 520. The memory 530 may be a non-transitory volatile memory device, such as a random access memory (RAM) device. In response to one or more operations by the processor, instructions and/or data may be loaded into the memory 530 from the persistent storage device 540 over the bus, in preparation for one or more operations by the processor utilising these instructions and/or data.

Working memory may include any or any combination of the memory 530, registers of the processor 520 and/or caches of the processor 520. As indicated above, multiple processing components may be used, in which case, the working memory may additionally or alternatively include, registers of one or more of the multiple processing components, caches of one or more of the multiple processing components, and/or memory (RAM) associated with the one or more of the multiple processing components, e.g. memory (RAM) associated with a GPU. During operation, weights may be loaded directly from non-volatile storage to registries, or may be loaded into RAM 530 first.

The persistent storage device 540 is a non-transitory non-volatile storage device, such as a flash memory, a ferroelectric random access memory (FeRAM), a programmable ROM, a solid state disk (SSD), or a hard disk drive (HDD). A non-volatile storage device maintains data stored on the persistent storage device 540 after power has been lost. The persistent storage device 540 may have a significantly greater access latency and lower bandwidth than the memory 530, e.g. it may take significantly longer to read and write data to/from the persistent storage device 540 than to/from the memory 530. However, the persistent storage 540 may have a significantly greater storage capacity than the memory 530. The persistent storage device 540 may alternatively be located remotely from the other components of the computing device 500, and accessed via the network interface 560 or some other interface for example.

A set of computer instructions is stored on persistent storage device 540 embodying the functionality as described herein. Data which is used by these instructions when executed is also stored, include the trained values of the weights of the neural network for example. As described above, the values of the weights of certain layers of the neural network are stored as ultra-low precision values. The computer instructions may be written in any of a number of programming languages, and may be stored as compiled code. The instructions can be embedded in the persistent storage device 540 during manufacture, or can be provided, as a whole or in part, after manufacture. For instance, the instructions can be introduced as a computer program product, which may be in the form of a download. Alternatively, modifications can be made by an update, or plug-in. For execution, the instructions and data are loaded into the working memory 530.

The I/O interface 550 facilitates connections between the computing device and external devices. The I/O interface 550 may receive signals from a given external device, e.g. a camera, microphone or sensor, convert them into a format intelligible by the processor 520 and relay them onto the bus for processing by the processor 520. The I/O interface 550 may also receive signals from the processor 520 and/or data from the memory 530, convert them into a format intelligible by a given external peripheral, e.g. a light, a motor, or a display, and relay them to the given external device. Although external devices are described here, it is understood that such devices may be integrated into a single device with the computer device 500, for example in the case of a mobile phone, in which a camera and screen are integrated into a single device, together with the components shown in FIG. 5.

The network interface 560 facilitates connections between the computing device and one or more other computing devices over a network. For example, the network interface 560 may be an Ethernet network interface, a Wi-Fi network interface, a cellular network interface, a Bluetooth network interface, or a Zigbee network interface.

In some embodiments, one or more of the above components may be omitted from the computing device 500. For example, where no network connectivity is required, the network interface 560 may be omitted.

The computing device may be or include a resource constrained-computing device, e.g. a microcontroller or an FPGA.

The computing device 500 may be or include a microcontroller, e.g. a computer configured for embedded applications, such as for use in Internet of Things devices. The computing device 500 may be an embedded device.

The example computing device 500 illustrated in FIG. 5 provides means capable of putting the methods described in relation to FIGS. 2 and 3 into effect.

The computing device 500 may also provide means capable of putting the training method described in relation to FIG. 4 into effect. The training method may be performed on a first system, and the trained neural network retained on the first system and executed on the first system. Alternatively, the training method may be performed on a first system, and the trained neural network loaded onto and implemented on a second system.

Figure 6A:
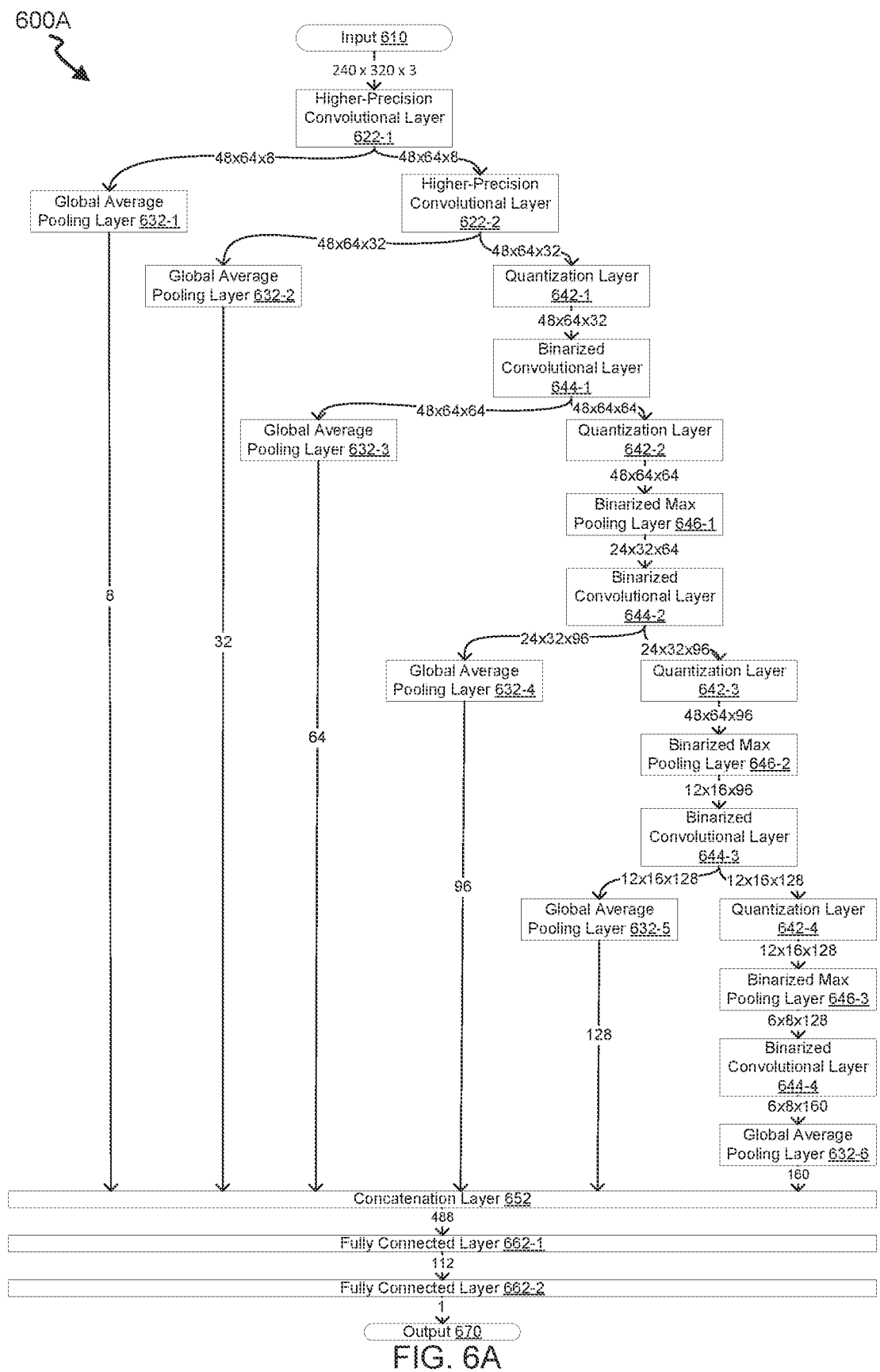
FIG. 6A shows a schematic diagram of an example neural network for detecting the presence of an object which may be used in a method in accordance with an embodiment.

FIG. 6A shows a schematic diagram of an example implementation of a neural network 600a for detecting the presence of an object in accordance with an embodiment. The example implementation is an example implementation of a neural network 100 as described in relation to FIG. 1.

The input 610 is a 3D matrix of dimensions 240×320×3. The 3D matrix represents a colour 2D image, with spatial dimensions of 240×320, and three channels which represent red, blue and green (RGB) components of the image.

The input 610 is received by a higher-precision convolutional layer 622-1. The higher-precision convolutional layer 622-1 calculates an intermediate output with the dimensions 48×64×8, i.e. spatial dimensions of 48×64 and with eight channels, by applying eight convolutional filters, each with dimensions of 7×7×3 to the input 610 with a stride of five, then applying an activation function and performing batch normalization. The filter weights are stored as higher-precision values and the input 610 comprises higher-precision values. The MAC computations are executed using higher precision values and are approximately real-valued, for example using int8, float16 or float32 format. The intermediate output comprises higher-precision values.

The intermediate output of the higher-precision convolutional layer 622-1 is received by a global average pooling layer 632-1. The global average pooling layer 632-1 calculates a reduced intermediate output which is a vector of length eight, by performing global average pooling across the spatial dimensions for each of the channels. The reduced intermediate output comprises higher-precision values.

The intermediate output of the higher-precision convolutional layer 622-1 is also received by a higher-precision convolutional layer 622-2. The higher-precision convolutional layer 622-2 calculates an intermediate output with the dimensions 48×64×32, i.e. spatial dimensions of 48×64 and with 32 channels, by applying 32 convolutional filters, each with dimensions of 1×1×8 to the input 610 with a stride of one, then applying an activation function and performing batch normalization. The filter weights are stored as higher-precision values and the input comprises higher-precision values. The output also comprises higher precision values.

The intermediate output of the higher-precision convolutional layer 622-2 is received by a global average pooling layer 632-2, The global average pooling layer 632-2 calculates a reduced intermediate output which is a vector of length 32 by performing global average pooling across the spatial dimensions for each of the channels. The reduced intermediate output comprises higher-precision values.

The intermediate output of the higher-precision convolutional layer 622-2 is received by a quantization layer 642-1. The quantization layer 642-1 is a precision-reducing layer which binarizes the intermediate output of the higher-precision convolutional layer 622-2 to obtain 1-bit values each representing 1 or −1. The quantization layer 642-1 calculates a binarized intermediate output with the same dimensions as the intermediate output of the higher-precision convolutional layer 622-2, 48×64×32, with each value therein being a binary value representing either 1 or −1.

The binarized intermediate output is received by a binarized convolutional layer 644-1. The binarized convolutional layer 644-1 is an ultra-low precision layer. The binarized convolutional layer 644-1 calculates an intermediate output with the dimensions 48×64×64, being spatial dimension of 48×64 and 64 channels, by applying 64 binarized convolutional filters to the binarized intermediate output, each with dimensions of 3×3×64 with a stride of one, then applying an activation function and performing batch normalization. The filter weights are binary values. The MAC computations are binarized, where both weights and input activations used in the MAC operations are binary valued. The intermediate output of the binarized convolutional layer 644-1 is a higher-precision output, as has been explained previously.

The intermediate output of the binarized convolutional layer 644-1 is received by a global average pooling layer 632-3. The global average pooling layer 632-3 calculates a reduced intermediate output which is a vector of length 64 by performing global average pooling across the spatial dimensions for each of the channels. The reduced intermediate output is also higher precision.

The intermediate output of the binarized convolutional layer 644-1 is received by a quantization layer 642-2 which calculates a binarized intermediate output with the same dimensions as the intermediate output of the binarized convolutional layer 644-2, 48×64×64, with each value therein being a binary value representing either 1 or −1.

The binarized intermediate output is received by a binarized max pooling layer 646-1, which is an ultra-low precision layer. The binarized max pooling layer is a local max pooling layer, which performs max pooling operations on each 2×2 area of the spatial dimensions of the binarized intermediate output. The binarized max pooling layer 646-1 calculates a pooled binarized intermediate output based on the binarized intermediate output. The dimensions of the pooled binarized intermediate output are 24×32×64. Max pooling does not affect the precision, so the pooled binarized intermediate output is a binarized output with each value representing either 1 or −1.

The pooled binarized intermediate output is received by a binarized convolutional layer 644-2. The binarized convolutional layer 644-2 calculates an intermediate output with the dimensions 24×32×96, e.g. spatial dimension of 24×32 and 96 channels, by applying 96 binarized convolutional filter to the pooled binarized intermediate output, each with dimensions of 3×3×96 with a stride of one, then applying an activation function and performing batch normalization. The filter weights are binary values. The intermediate output of the binarized convolutional layer 644-2 is a higher-precision output for the reasons previously described.

The intermediate output of the binarized convolutional layer 644-2 is received by a global average pooling layer 632-4. The global average pooling layer 632-4 calculates a reduced intermediate output which is a vector of length 96 by performing global average pooling across the spatial dimensions for each of the channels, and outputs a higher precision output.

The intermediate output of the binarized convolutional layer 644-2 is received by a quantization layer 642-3 which calculates a binarized intermediate output with the same dimensions as the intermediate output of the binarized convolutional layer 644-2, 24×32×96, with each value therein being a binary value representing either 1 or −1.

The binarized intermediate output is received by a binarized max pooling layer 646-2. The binarized max pooling layer is a local max pooling layer, which performs max pooling operations on each 2×2 area of the spatial dimensions of the binarized intermediate output. The binarized max pooling layer 646-2 calculates a pooled binarized intermediate output based on the binarized intermediate output. The dimensions of the pooled binarized intermediate output are 12×16×96.

The pooled binarized intermediate output is received by a binarized convolutional layer 644-3. The binarized convolutional layer 644-3 calculates an intermediate output with the dimensions 12×16×128, e.g. spatial dimension of 12×16 and 128 channels, by applying 128 binarized convolutional filter to the pooled binarized intermediate output, each with dimensions of 3×3×96 with a stride of one, then applying an activation function and performing batch normalization. The filter weights are binary values. The intermediate output of the binarized convolutional layer 644-3 is a higher-precision output for the reasons previously described.

The intermediate output of the binarized convolutional layer 644-3 is received by a global average pooling layer 632-5. The global average pooling layer 632-5 calculates a reduced intermediate output which is a vector of length 128 by performing global average pooling across the spatial dimensions for each of the channels.

The intermediate output of the binarized convolutional layer 644-3 is received by a quantization layer 642-4 which calculates a binarized intermediate output with the same dimensions as the intermediate output of the binarized convolutional layer 644-3, 12×16×128, with each value therein being a binary value representing either 1 or −1.

The binarized intermediate output is received by a binarized max pooling layer 646-3. The binarized max pooling layer is a local max pooling layer, which performs max pooling operations on each 2×2 area of the spatial dimensions of the binarized intermediate output. The binarized max pooling layer 646-3 calculates a pooled binarized intermediate output based on the binarized intermediate output. The dimensions of the pooled binarized intermediate output are 6×8×128.

The pooled binarized intermediate output is received by a binarized convolutional layer 644-4. The binarized convolutional layer 644-4 calculates an intermediate output with the dimensions 6×8×160, e.g. spatial dimension of 6×8 and 160 channels, by applying 160 binarized convolutional filter to the pooled binarized intermediate output, each with dimensions of 3×3×128 with a stride of one, then applying an activation function and performing batch normalization. The filter weights are binary values. The intermediate output of the binarized convolutional layer 644-4 is a higher-precision output for the reasons previously described.

The intermediate output of the binarized convolutional layer 644-4 is received by a global average pooling layer 632-6. The global average pooling layer 632-65 calculates a reduced intermediate output which is a vector of length 160 by performing global average pooling across the spatial dimensions for each of the channels.

The higher-precision outputs of each of the global average pooling layers 632 are received by a concatenation layer 652. The concatenation layer 652 calculates a combined intermediate output, which is a vector with 488 elements. The concatenation layer 652 calculates the combined intermediate output by concatenating the outputs of the global average pooling layers 632. The output of the concatenation layer 652 comprises a vector of higher precision values which is the combined intermediate output.

The combined intermediate output is received by a higher-precision first fully connected layer 662-1. The first fully connected layer 662-1 calculates, as an output, a vector having 112 elements based on the combined intermediate output. The first fully connected layer 662-1 comprises a feed forward neural network layer, with a ReLu activation function. The weights of the first fully connected layer 662-1 are higher-precision values. The input activations to the first fully connected layer 662-1 are higher-precision values. The outputs of the first fully connected layer 662-1 are higher-precision values. The output is a vector of length 112.

A higher-precision second fully connected layer 662-2 receives the output of the first fully connected layer 662-1. The second fully connected layer 662-2 calculates, as an output, a numerical value, e.g. a scalar, based on the output of the first fully connected layer 662-1. The second fully connected layer 662-2 comprises a feed forward neural network layer, with a sigmoid activation function. The weights of the second fully connected layer 662-1 are higher-precision values. The input activations to the second fully connected layer 662-2 are higher-precision values. The output of the second fully connected layer 662-2 is higher-precision.

The output of the fully connected layer 662-2 is the neural network output 670. The output 670 is the probability that the image represented by the input 610 contains an object of a given type. For example, it may be a probability that the image comprises a person.

The neural network 600a comprises a plurality of layers. Each layer maps from one or multiple inputs to outputs, and is executed as an isolated computational unit in the neural network 600a. The neural network 600a is a binarized network which may be implemented on resource-constrained devices such as microcontrollers or low-powered FPGAs. In the neural network 600a, skip-connections are combined with global pooling in order to reduce the overhead in the forward pass.

The first layer in the neural network 600a is a higher-precision layer, including a higher-precision layer as the first layer can provide improved performance, since this layer generates the initial information.

The neural network 600a comprises two higher-precision convolutional neural network layers as the first two layers. The first higher-precision convolutional layer 622-1 reduces the size of the spatial dimensions, in this case reducing from 240×320 to 48×64, whilst increasing the number of channels from 3 to 8. The second higher-precision convolutional layer 622-1 does not change the spatial dimensions but further increases the number of channels to 32. In general, a reduction in the size of the spatial dimensions with an increase in the number of channels may be performed in the initial higher-precision convolutional layer(s). The increase in the number of channels may be performed in two steps, by two higher-precision convolutional layers as in the neural network 600a. This is because performing the initial higher-precision convolutional operations can require a large amount of working memory. Splitting the increasing of the number of channels across two layers means that the memory requirement is split across the two operations. Each higher precision convolutional neural network layer comprises a skip connection to the higher-precision head.

One or more long-range global-pooled skip-connections are used to directly connect a subset of the non-head layers in the network to the higher-precision head, skipping one or more binarized layers. The connections are globally pooled, i.e. spatial information is removed, through the use of global average pooling. This results in multiple inputs to the higher-precision head, and therefore the inputs are combined, for example through concatenation, before being fed into the higher precision head.

The neural network 600a is trained by updating the parameters of the neural network 600a using supervised learning and a categorical cross entropy loss. The training process uses a set of training samples, Each training sample comprises an input 610 which is a 3D matrix of dimensions 240×320×3 representing a colour 2D image, with spatial dimensions of 240×320, and three channels which represent red, blue and green (RGB) components of the image. Each training sample also comprises a "true" or "gold standard" output. The true output indicates whether the image represented by the input 610 contains an object of a given type. For example, it may indicate whether the image comprises a person, where the true output may be a value "1" when the image comprises a person and "0" when the image does not comprise a person. Each training sample may be manually labelled with the true output. The set of training samples comprises samples in which the true output is 1 and samples in which the true output is 0.

Figure 6B:
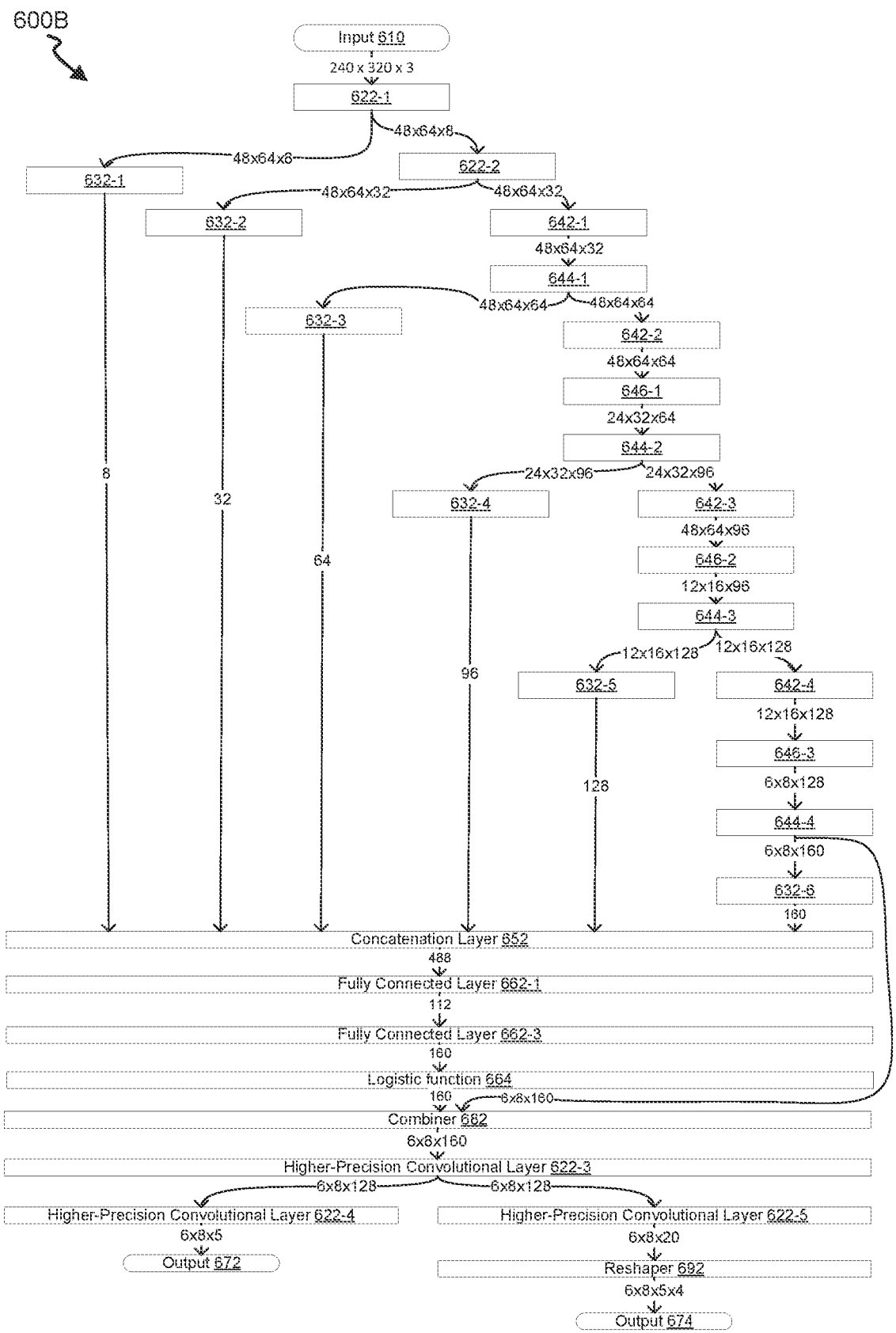
FIG. 6B shows a schematic diagram of an example of a neural network for detecting the location of an object which may be used in a method in accordance with an embodiment.

FIG. 6B shows a schematic diagram of an example implementation of a neural network 600B for locating an object in an image in accordance with an embodiment. The example implementation is an example implementation of a neural network 100 as described in relation to FIG. 1.

The components of the neural network 600B having the same reference numerals as those of neural network 600A are as described in relation to neural network 600A.

In neural network 600B, the output of the first higher-precision fully connected layer 662-1 is received by a further higher-precision fully connected layer 662-3. The further fully connected layer calculates, as an output, a vector having 160 elements based on the output of the fully connected Layer 662-1. The weights of the further fully connected layer 662-3 are higher-precision values. The input activations to the further fully connected layer 662-3 are higher-precision values. The outputs of the further fully connected layer 662-3 are higher-precision values. The further fully connected layer 662-3 outputs a vector of length 160.

The output of the fully connected layer 662-3 is received by an activation function 664. The activation function may be a logistic function for example. This applies a logistic function to each of the elements of the output of the fully connected layer 662-3. The result is a vector having 160 elements. The inputs and outputs to the logistic function 664 are higher precision values. There are no weights.

The higher-precision output of the logistic function 664 and the higher-precision output of the binarized convolutional layer 644-4 are received by a combiner 682. The combiner multiplies each of the 160 channels of the output of the binarized convolutional layer 644-4 by a respective one of the 160 elements of the vector output from the logistic function 664. The result of this multiplication is the output of the combiner 682, which is a 3D matrix having spatial dimensions 6×8 and 160 channels. The inputs and outputs to the combiner 682 are higher precision values. There are no weights.

In these operations, the vector output from the further fully connected layer 662-3 acts as a channel descriptor. The global average pooling performed prior to the further fully connected layer 662-3, and the further reduction in size performed by the first fully connected layer 662-1 and the further fully connected layer 662-3, allows channel wise information to be obtained. The output of the logistic function 664 is used as a set of channel weights, where each element of the vector output from the logistic function 664 then weights one of the channels of the output of the binarized convolutional layer 644-4, The combined globally pooled outputs of the skipped connections are used to weight the channels of the output of the convolutional layers, which in turn are used to generate the final neural network output. These operations use channel-wise information to enhance features with spatial information.

The output of the combiner 682 is received by the higher-precision convolutional layer 622-3. The higher-precision convolutional layer 622-3 calculates an output with the dimensions 6×8×128, i.e. spatial dimensions of 6×8 and with 128 channels, by applying 128 convolutional filters, each with dimensions of 3×3×160 to the output of the excite layer 622-3 with a stride of one, then applying an activation function and performing batch normalization.

The output of the higher-precision convolutional layer 622-3 is received by a higher-precision convolutional layer 622-4, The higher-precision convolutional layer 622-4 calculates an output with the dimensions 6×8×5, e.g. spatial dimension of 6×8 and with 5 channels, by applying 5 convolutional filters, each with dimensions of 3×3×128, then applying an activation function and performing batch normalization.

The output of the higher-precision convolutional layer 622-4 is a first output 672 of the neural network 600B. The spatial dimensions of the first output 672 correspond to 40×40 portions of the input image 610. Each of the elements in the 6×8 spatial dimensions of the first dimensions 672 corresponds to a 40×40 portion of the input image 610. Each of the five channels corresponds to a different shape, e.g. rectangles having different aspect ratios, Each element of the first output 672 indicates the probability that the object is located within the portion of the input image represented by that element according to the spatial dimensions and that the object is bounded by a shape of the type corresponding to the channel.

The output of the higher-precision convolutional layer 622-3 is also received by another higher-precision convolutional layer 622-5. The higher-precision convolutional layer 622-5 calculates an output with the dimensions 6×8×20, with spatial dimensions of 6×8 and with 20 channels, by applying 20 convolutional filters, each with dimensions of 3×3×128, then applying an activation function and performing batch normalization.

The output of the higher-precision convolutional layer 622-5 is received by a reshaper 692, The reshaper transforms the 6×8×20 output of the higher-precision convolutional layer 622-5 into a four dimensional matrix output with the dimensions 6×8×5×4.

The output of the reshaper 692 is a second output 674 of the neural network 600B. In the second output 674, there is a vector of four elements for each element of the first output 672. The four elements represent an x offset, a y offset, a height scaling factor and a width scaling vector for the corresponding type of shape and portion of the input 610 of the first output 672.

In combination, the first output 672 and the second output 674 indicate the likely locations of one or more objects in the image, with the first output 672 indicating likely portions of the image and shapes of the boundary of the object, e.g. the most likely anchor positions and shapes, and the second output 674 indicating properties of these shapes, e.g. adjustments to these anchor positions or shapes.

In this example, the combined globally pooled outputs of the skipped connections are used to weight the channels of the output of the convolutional layers, which in turn are used to generate the final neural network output.

The neural network 600b is trained by updating the parameters of the neural network 600a using a focal loss. For example, the neural network 600b is trained using a focal loss as described in Lin et al., Focal Loss for Dense Object Detection (2018), the entire contents of which are incorporated herein by reference.

The performance of various architectures with and without skip connections between a first part of the network and the combiner are compared. The performance is measured using the Matthew Correlation Coefficient (MCC) score. The MCC scores are averaged over ten models trained with different random seeds but otherwise identical settings. As the MCC scores are averaged over ten models, the variance is shown for these scores.

Table 1 compares networks with and without skip connections with various input precisions and weight precisions. The input precision indicates the precision in bits of the inputs to the ultra-low precision layers, e.g. the activation precision, and the weight precision indicates the precision in bits of the weights of the ultra-low precision layers, e.g. the kernel precision. In all of these networks, a Recitified Linear Unit is applied as a non-linear activation function after an ultra-low precision convolution. It can be seen that the skip connections consistently improve performance,

TABLE 1

| Input Precision | Weight Precision | MCC (± var.) without skip connections | MCC (± var.) with skip connections |
|---|---|---|---|
| 1 | 1 | 0.667626(±0.000517) | 0.685838(±0.000790) |
|   | 2 | 0.687819(±0.000934) | 0.704476(±0.000518) |
| 2 | 1 | 0.685154(±0.000569) | 0.699855(±0.000143) |
|   | 2 | 0.703563(±0.000325) | 0.711076(±0.000739) |

TABLE 1-continued

| Input Precision | Weight Precision | MCC (± var.) without skip connections | MCC (± var.) with skip connections |
| --- | --- | --- | --- |
| 4 | 1 | 0.711553(±0.000449) | 0.743973(±0.000434) |
|   | 2 | 0.734790(±0.000222) | 0.745953(±0.000230) |
| 32 | 1 | 0.776995(±0.000382) | 0.787839(±0.000254) |
|   | 2 | 0.786674(±0.000178) | 0.789252(±0.000240) |

Table 2 compares two methods of combining the reduced intermediate outputs from the skip connections: concatenation and addition. In the case of addition, zero-padding is applied such that all of the reduced intermediate outputs have the same length.

TABLE 2

| Combining Method | MCC(± var.) |
| --- | --- |
| Concatenation | 0.685967(±0.000790) |
| Addition | 0.686096(±0.000465) |

Figure 7:
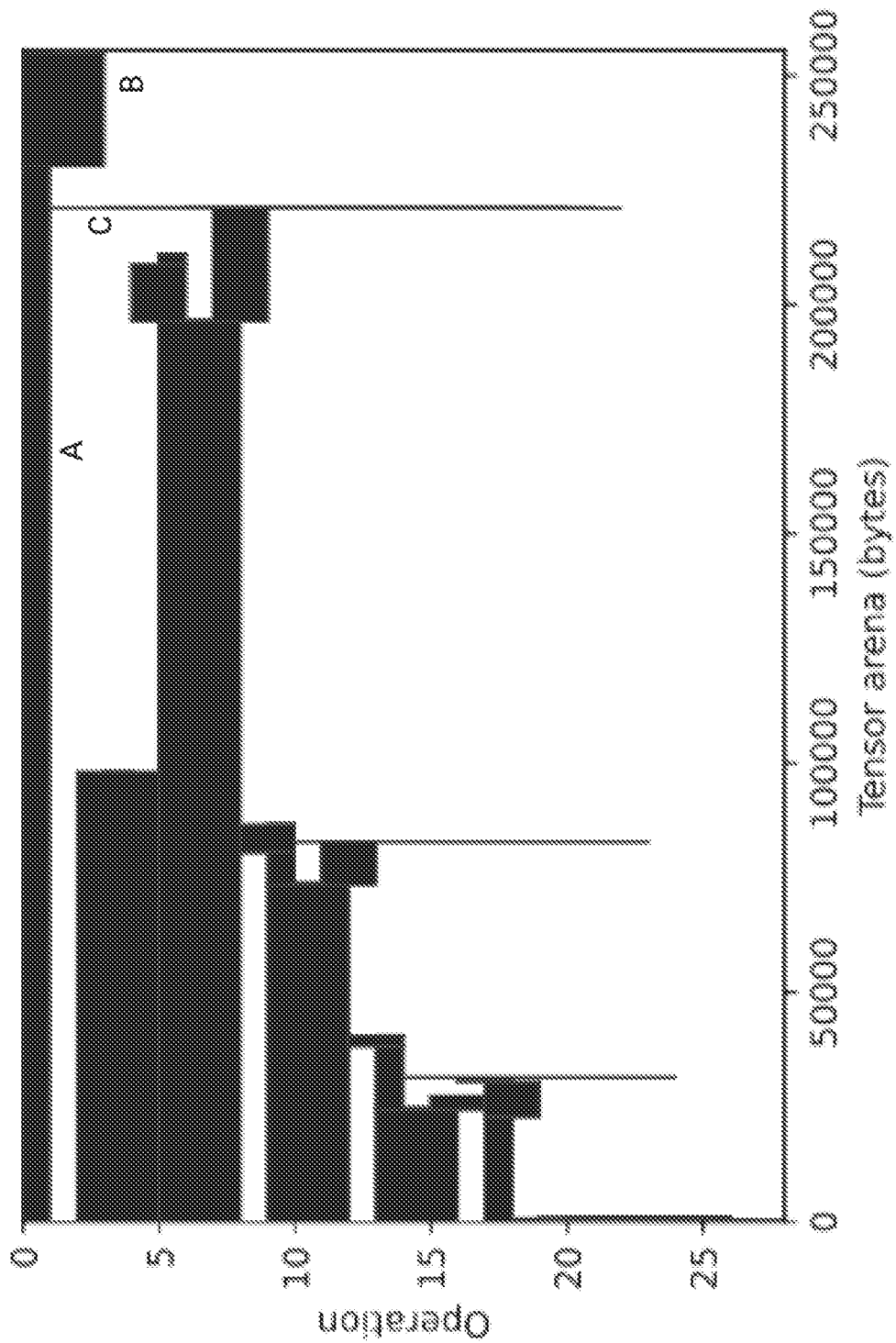
FIG. 7 is a graph illustrating usage of memory during inference by a neural network in accordance with an embodiment.

FIG. 7 is a chart illustrating the usage of working memory during inference by a neural network in accordance with an embodiment. The neural network may be a neural network such as described in relation to FIG. 1 for example.

The y-axis indicates the number of the operation in the neural network being performed starting from the top, e.g. 0 being the first operation. 1 being the second operation performed, 2 being the third operation performed, . . . , and being the nth operation performed. Thus, the y-axis can be understood as time. The x-axis is referred to as the Tensor arena and indicates where a tensor is stored in working memory during the execution of the network, with the width of each box indicating the amount of working memory used by a given tensor. The height of each box can be understood as the number operations for which the given tensor is kept in memory before being deleted, i.e. removed from the Tensor arena.

The box A represents a first tensor corresponding to an input. As is illustrated, the first tensor takes up the largest amount of memory but can be discarded after the first operation.

The box B is the high-precision output of the first operation, referred to as the first intermediate output. For example, in the neural network described in relation to FIG. 1, the box B represents the output of a first layer 120. This takes up less memory than the input image but still takes up a significant amount of memory, but can be discarded after the third operation. In this example, the third operation is the first layer of the second set of layer(s) 140-1.

The box C is the result of the second operation, which is the reducer 130-1 in this example, e.g. a global pooling operation performed on the first intermediate output. The second operation globally pools B and generates C. The box C is referred to as the reduced first intermediate output. This takes up less memory than the (unreduced) first intermediate output, but is preserved until almost the end of the network for inputting to the combiner 150. The use of the reduced first intermediate output reduces memory usage while preserving precision information from the first intermediate output.

As has been described above, an engine which executes the neural network may employ a memory management scheme such as automatic reference counting or garbage collection to remove a tensor from working memory when it is not required for any subsequent operations. The engine determines at what point each tensor can be removed from working memory prior to execution of the neural network, and then removes the tensor from working memory at the determined point during execution of the neural network.

The engine determines that tensor A may be discarded after the first operation (after the first layer 120 has been executed) and discards tensor A at this point during execution. The engine determines that tensor B may be discarded after the third operation (after the first layer of the second set of layer(s) 140-1 have been executed) and discards tensor B at this point during execution. The engine determines that tensor C must be retained in working memory until the combiner 150 is executed, and retains the tensor C until this point during execution. The engine may discard tensor C after the combiner 150 is executed. The determination of when each tensor may be discarded may be made offline or just prior to execution for example.

Implementations of the subject matter and the operations described in this specification can be realized in digital electronic circuitry, or in computer software, firmware, or hardware, including the structures disclosed in this specification and their structural equivalents, or in combinations of one or more of them. For instance, hardware may include processors, microprocessors, electronic circuitry, electronic components, integrated circuits, etc. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A computer-implemented method comprising:
obtaining an input;
processing the input using a neural network comprising a plurality of layers, comprising:
calculating, using a first one or more layers of the plurality of layers, a first intermediate output from the input, wherein the first intermediate output is of a given size and is stored in memory;
reducing a size of one or more dimensions of the first intermediate output to generate a reduced first intermediate output that is smaller in size than the first intermediate output;

calculating, from the first intermediate output using a second one or more layers of the plurality of layers, a second intermediate output, the second one or more layers comprising one or more ultra-low precision layers;

deleting, after execution of at least one of the second one or more layers, the first intermediate output from the memory;

reducing a size of one or more dimensions of the second intermediate output to generate a reduced second intermediate output that is smaller in size than the second intermediate output;

calculating, after reducing the size of the one or more dimensions of the first intermediate output to generate the reduced first intermediate output and from the second intermediate output using a third one or more layers of the plurality of layers, a third intermediate output, wherein the first intermediate output is deleted from the memory prior to execution of at least one of the third one or more layers;

combining a plurality of reduced intermediate outputs to derive a combined intermediate output, wherein the plurality of reduced intermediate outputs combined comprise the reduced first intermediate output and the reduced second intermediate output; and calculating, using one or more higher-precision layers of the plurality of layers, a neural network output using the combined intermediate output; and outputting an output based on the neural network output.

2. The method of claim 1, wherein reducing a size of one or more dimensions of the first intermediate output comprises reducing the spatial information of the first intermediate output and wherein reducing a size of one or more dimensions of the second intermediate output comprises reducing spatial information of the second intermediate output.

3. The method of claim 1, wherein the first intermediate output is a higher-precision output and the second intermediate output is a higher-precision output.

4. The method of claim 1, wherein reducing the spatial information of the first intermediate output comprises performing a pooling operation on the first intermediate output.

5. The method of claim 4, wherein the pooling operation is a global pooling operation.

6. The method of claim 1, wherein the one or more ultra-low precision layers comprise one or more binarized convolutional neural network layers.

7. The method of claim 1, wherein the neural network comprises a first part comprising the layers which are executed prior to the combining step, the method further comprising:

for more than half of the convolutional layers in the first part of the neural network outputting a higher precision intermediate output, reducing a size of one or more dimensions of the respective intermediate output to give a respective reduced intermediate output;

wherein the plurality of reduced intermediate outputs comprises the respective reduced intermediate outputs.

8. The method of claim 1, wherein a neural network layer receiving the input is a higher precision layer.

9. The method of claim 8, wherein the neural network layer receiving the input is a convolutional neural network layer which reduces size of one or more spatial dimensions, and wherein the subsequent neural network layer is a higher precision convolutional neural network layer which increases the number of channels.

10. The method of claim 1, wherein the combined intermediate output is used to weight the output channels of a convolutional neural network layer.

11. A computer-implemented method for training a neural network comprising a plurality of layers, the method comprising:

performing a forward pass using the neural network for each training sample of one or more training samples, each training sample comprising an input, performing each forward pass comprising:

calculating, using a first one or more layers of the plurality of layers, a first intermediate output from the input, wherein the first intermediate output is of a given size and is stored in memory;

reducing a size of one or more dimensions of the first intermediate output to generate a reduced first intermediate output that is smaller in size than the first intermediate output;

calculating, from the first intermediate output using a second one or more layers of the plurality of layers, a second intermediate output, the second one or more layers comprising one or more ultra-low precision layers;

reducing a size of one or more dimensions of the second intermediate output to generate a reduced second intermediate output that is smaller in size than the second intermediate output;

deleting, after execution of at least one of the second one or more layers, the first intermediate output from the memory;

calculating, after reducing the size of the one or more dimensions of the first intermediate output to generate the reduced first intermediate output and from the second intermediate output using a third one or more layers of the plurality of layers, a third intermediate output, wherein the first intermediate output is deleted from the memory prior to execution of at least one of the third one or more layers;

combining a plurality of reduced intermediate outputs to derive a combined intermediate output, wherein the plurality of reduced intermediate outputs combined comprise the reduced first intermediate output and the reduced second intermediate output; and calculating, using one or more higher-precision layers of the plurality of layers, a neural network output using the combined intermediate output; and updating the parameters of the neural network.

12. A system comprising one or more processors, the one or more processors configured to:

process an input using a neural network comprising a plurality of layers, comprising:

calculating, using a first one or more layers of the plurality of layers, a first intermediate output from the input, wherein the first intermediate output is of a given size and is stored in memory;

reducing a size of one or more dimensions of the first intermediate output to generate a reduced first intermediate output that is smaller in size than the first intermediate output;

calculating, from the first intermediate output using a second one or more layers of the plurality of layers, a second intermediate output, the second one or more layers comprising one or more ultra-low precision layers;

reducing a size of one or more dimensions of the second intermediate output to generate a reduced second intermediate output that is smaller in size than the second intermediate output;

deleting, after execution of at least one of the second one or more layers, the first intermediate output from the memory;

calculating, after reducing the size of the one or more dimensions of the first intermediate output to generate the reduced first intermediate output and from the second intermediate output using a third one or more layers of the plurality of layers, a third intermediate output, wherein the first intermediate output is deleted from the memory prior to execution of at least one of the third one or more layers;

combining a plurality of reduced intermediate outputs to derive a combined intermediate output, wherein the plurality of reduced intermediate outputs combined comprise the reduced first intermediate output and the reduced second intermediate output; and calculating, using one or more higher-precision layers of the plurality of layers, a neural network output using the combined intermediate output.

13. The system of claim 12, wherein reducing a size of one or more dimensions of the first intermediate output comprises reducing the spatial information of the first intermediate output and wherein reducing a size of one or more dimensions of the second intermediate output comprises reducing spatial information of the second intermediate output.

14. The system of claim 12, wherein reducing the spatial information of the first intermediate output comprises performing a pooling operation on the first intermediate output.

15. The system of claim 14, wherein the pooling operation is a global pooling operation.

16. The system of claim 12, wherein the neural network comprises a first part comprising the layers which are executed prior to the combining step, wherein process an input using a neural network further comprises:

for more than half of the convolutional layers in the first part of the neural network outputting a higher precision intermediate output, reducing a size of one or more dimensions of the respective intermediate output to give a respective reduced intermediate output;

wherein the plurality of reduced intermediate outputs comprises the respective reduced intermediate outputs.

17. The system of claim 12, wherein a neural network layer receiving the input is a higher precision layer.

18. The system of claim 12, wherein the neural network layer receiving the input is a convolutional neural network layer which reduces size of one or more spatial dimensions, and wherein the subsequent neural network layer is a higher precision convolutional neural network layer which increases the number of channels.

19. The method of claim 1, wherein the input comprises image data, and wherein the method further comprises determining that at least one object is present in the image based on the neural network output, and outputting an output indicating that the at least one object is present in the image.

20. The method of claim 1,
wherein the first intermediate output comprises a 3D matrix of values, the 3D matrix of values having a first height, a first width and a first number of channels, wherein each channel comprises a 2D matrix of values having the first height and the first width, and wherein reducing the size of one or more dimensions of the first intermediate output to generate the reduced first intermediate output comprises deriving a single value for each of a plurality of areas of the 2D matrices to generate a 3D matrix having a second height, a second width and the first number of channels, wherein the second height is smaller than the first height and the second width is smaller than the first width.

21. The method of claim 1,
wherein the first intermediate output comprises a 3D matrix of values, the 3D matrix of values having a first height, a first width and a first number of channels, wherein each channel comprises a 2D matrix of values having the first height and the first width, and wherein reducing the size of one or more dimensions of the first intermediate output to generate the reduced first intermediate output comprises deriving a single value for each channel to generate a vector comprising a single value for each channel.

22. The method of claim 1, further comprising deleting the reduced first intermediate output from memory after the combining of plurality of reduced intermediate outputs to derive the combined intermediate output.

* * * * *